(12) United States Patent
Takahashi

(10) Patent No.: US 7,119,920 B2
(45) Date of Patent: Oct. 10, 2006

(54) IMAGE FORMATION SYSTEM

(75) Inventor: Hiroyuki Takahashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 89 days.

(21) Appl. No.: 10/924,894

(22) Filed: Aug. 25, 2004

(65) Prior Publication Data

US 2005/0018228 A1    Jan. 27, 2005

Related U.S. Application Data

(62) Division of application No. 09/411,840, filed on Oct. 4, 1999, now Pat. No. 6,912,059.

(30) Foreign Application Priority Data

Oct. 7, 1998    (JP)    ................................. 10-285338

(51) Int. Cl.
    *B41L 3/14*    (2006.01)
(52) U.S. Cl. ..................... 358/1.15; 355/407
(58) Field of Classification Search ................. 358/1.9, 358/1.15, 2.1, 3.32, 414; 355/407–408
    See application file for complete search history.

(56) References Cited

U.S. PATENT DOCUMENTS

| | | | |
|---|---|---|---|
| 4,893,153 A | 1/1990 | Sales et al. | 399/382 |
| 5,014,093 A | 5/1991 | Ng | 399/54 |
| 5,287,194 A | 2/1994 | Lobiondo | 358/296 |
| 6,003,065 A | 12/1999 | Yan et al. | 709/201 |

OTHER PUBLICATIONS

Xerox Disclosure Journal P.F. Morgan, vol. 16, No. 6, Nov./Dec. 1991, pp. 381-383, "Integration of Black Only and Color Printers".

*Primary Examiner*—Thomas D. Lee
*Assistant Examiner*—Stephen Brinich
(74) *Attorney, Agent, or Firm*—Fitzpatrick, Cella, Harper & Scinto

(57) ABSTRACT

In case of forming images of a job, which includes color pages and black/white pages, in order to constitute a system which can obtain pages of individually formed images with a state in original page order by selectively using both a color image formation apparatus and a monochrome image formation apparatus with a simple operation, job contents are transferred to each of the color image formation apparatus and the monochrome image formation apparatus when the job, which includes the color pages and the black/white pages, is outputted from a computer. The color image formation apparatus forms only images of color pages, and then an user sets the color pages in an inserter. The monochrome image formation apparatus forms monochrome images when pages are black/white and feeds sheets from the inserter when pages are color.

22 Claims, 18 Drawing Sheets

IMAGE FORMATION SYSTEM

RELATED APPLICATION

This application is a division of application Ser. No. 09/411,840, filed on Oct. 4, 1999 now U.S. Pat. No. 6,912,059, the entire disclosure of which is incorporated herein by reference.

BACKGROUND OF THE INVENTION

1. Field of the Invention

The present invention relates to an image formation system having a color image formation apparatus and a monochrome image formation apparatus which are connected to a network.

2. Related Background Art

Conventionally, in a system having a color printer and a monochrome printer which are connected to a network, in a case where an user at a client computer causes the printers to perform a network print, it has been known that the user selects a printer among plural printers including the color printer and the monochrome printer to perform a print on a computer network.

However, in spite of color originals coexist with black/white originals in one job, only either of the color printer and the monochrome printer can perform the print. Although the color printer can perform the print in full color, in respect of printing speed and the cost of printing, the monochrome printer is superior to the color printer. Therefore, it is desirable that a page of only black/white image is to be printed by the monochrome printer. However, in a conventional system, an user judges whether or not each page has to be printed by the color printer or the monochrome printer. Further, the user designates a page print every page. At this time, since an operation of selecting the printer every time has to be performed, there occurs an inconvenience situation. Further, since the user has to perform an operation of assorting sheets printed by the color printer and the monochrome printer in page order, there occurs an inconvenience situation.

Particularly, in a case where a lot of sheets are to be printed, although processing time and the cost are remarkably exposed, required time for the handwork by the user becomes considerable. It is desired to save this waste of time.

SUMMARY OF THE INVENTION

An object of the present invention is to provide an image formation system which can solve the above-mentioned problem.

Another object of the present invention is to provide an image formation system enables to obtain individually image formed data in original page order by forming images with a simple operation of differently using both a color image formation apparatus and a monochrome image formation apparatus when images are formed in a job contains color pages and black/white pages.

Other objects and features of the present invention will be apparent from the following detailed explanation and the attached drawings.

DETAILED DESCRIPTION OF PREFERRED EMBODIMENTS

[Embodiment]

(General Description of System)

Figure 1:
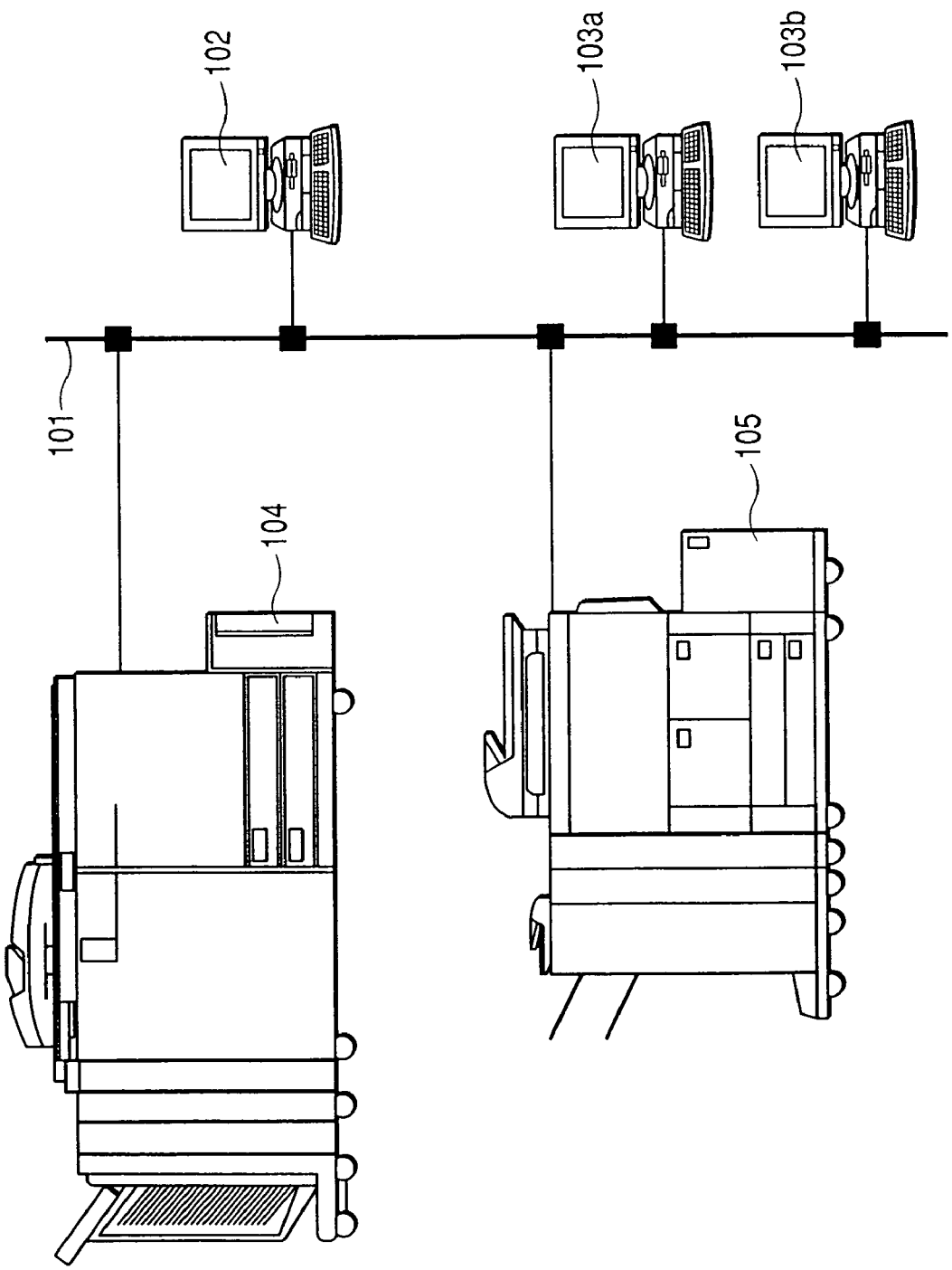
FIG. 1 is a view showing an entire system of an embodiment of the present invention.
Figure 2:
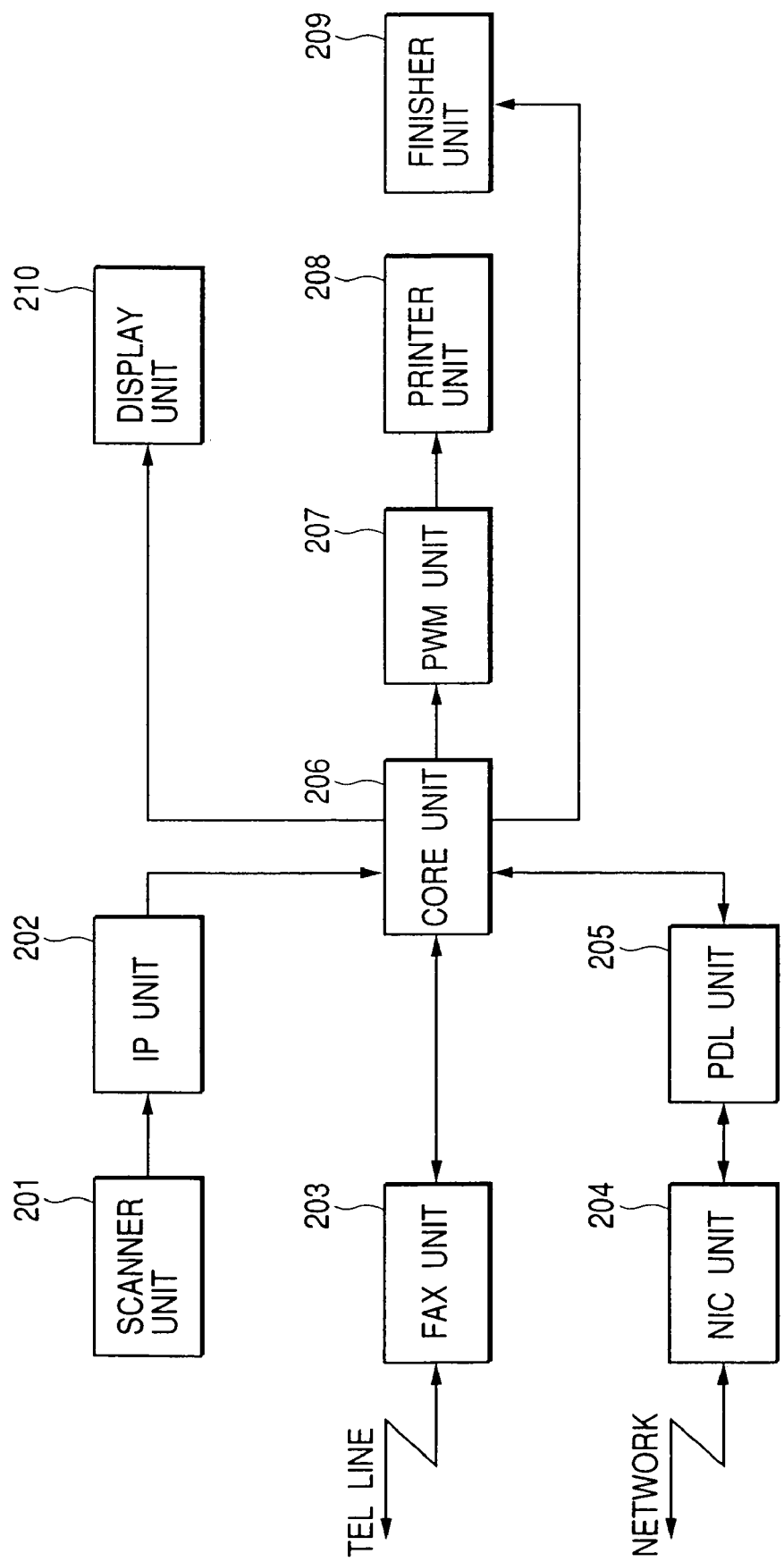
FIG. 2 is a block diagram of an entire image formation apparatus.

FIG. 1 shows the outline of a system of an embodiment for the present invention. A computer 102 connected to a network 101 is a sever, computers 103a and 103b are clients. Although not shown, several other clients are also connected. Hereafter, numeral 103 is considered as a representative of the clients.

Further, MFP's (Multi Function Peripheral) 104 and 105 are connected to the network 101. Numeral 104 is a color MFP capable of full color scanning, printing and the like. Numeral 105 is a black and white MFP, performing monochromatic scanning, printing and the like. In addition, although not shown, machines other than the above-mentioned MFP's such as scanners, printers, faxes or the like are connected to the network 101.

Here, by running application softwares which perform so-called DTP (Desk Top Publishing) on the computer 103, all sort of texts/figures are created/edited. The computer 103 converts the produced texts/figures into PDL (Page Description Language) and sends them to the MFP's 104 and 105 via the network 101 for print out.

As a mechanism to inform successively the computers 102 and 103 side, on the information and the status of the MFP's 104 and 105, the MFP's 104 and 105 respectively are provided with communication means which allows data exchange with the computers 102 and 103 through the network 101. Moreover, the computers 102 and 103 have utility softwares which function by receiving the information such that the MFP's 104 and 105 can be managed by the computers 102 and 103.

(Structure of the MFP's 104 and 105)

Subsequently, the structure of the MFP's 104 and 105 will be explained using FIGS. 2 to 12. However, since the difference between the MFP's 104 and 105 is the difference between full color and monochrome, and since full color machines often include the same structure as monochrome machines, with the exception of the color processing parts, the explanation will be limited here to the full color machines and, at any time, explanations for the monochrome machine will be added, if needed.

The MFP's 104 and 105 include a scanner unit 201 which performs image reading, an IP unit 202 for image processing of image data, a FAX unit 203, which is a typical style of facsimile communication, performs transmission/reception of images using a telephone line, moreover, a NIC (Network Interface Card) unit 204 to exchange image data or information on the devices using the network and a PDL unit 205 which develops the page description language (PDL) sent by the computer 103 into an image signal. Then according to the usage of the MFP's 104 and 105, a core unit 206 temporarily stores the image signal or determines their routes.

Then the image data outputted by the core unit 206 is sent to a printer unit 208 which performs image formation. The sheets printed out by the printer unit 208 are sent to a finisher unit 209 where assortment of the sheets and finishing of the sheets are performed.

In addition, a display unit 210 can be used to check without printing the content of an image or to check the aspect of the image prior to printing (preview).

(Structure of the Scanner Unit 201)

Figure 3:
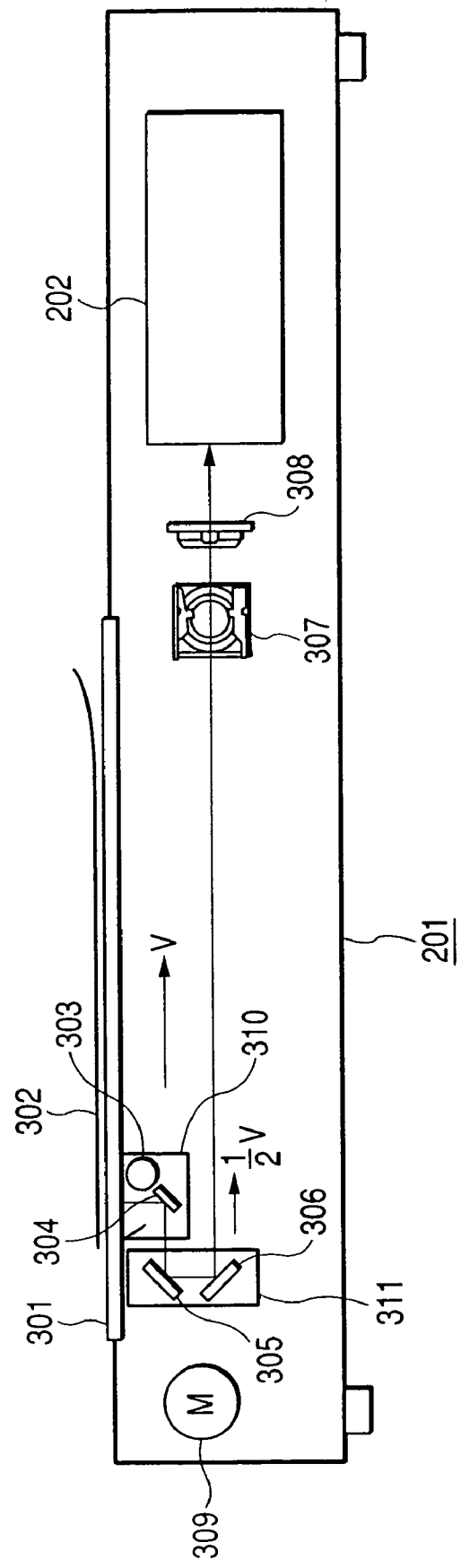
FIG. 3 is a view showing a scanner unit of the image formation apparatus.

The structure of the scanner unit 201 will be explained using FIG. 3. Numeral 301 is a document table glass on which a document 302 to be read is placed. The document 302 is exposed by an illuminating lamp 303 and its reflected light pass via mirrors 304, 305 and 306 through a lens 307 to form an image on a CCD 308. The whole surface of the document 302 is scanned by moving a first mirror unit 310 comprising the mirror 304 and the illuminating lamp 303 at speed V, and by moving a second mirror unit 311 comprising the mirrors 305 and 306 at speed ½V. The first mirror unit 310 and the second mirror unit 311 are driven by a motor 309.

(Structure of the Image Processing Unit 202)

Figure 4:
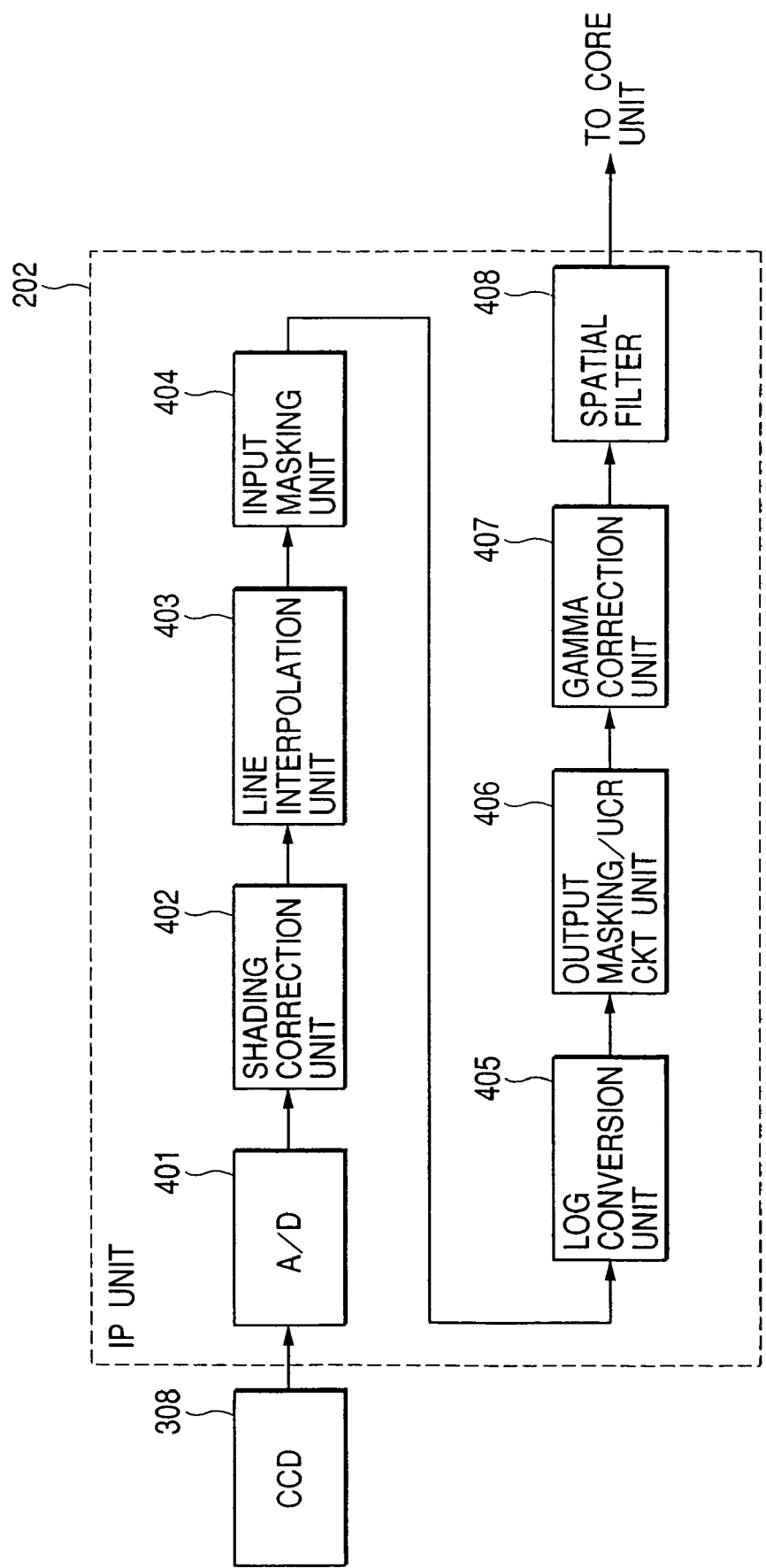
FIG. 4 is a block diagram of an IP unit of the image formation apparatus.

The structure of the IP unit (image processing unit) 202 will be explained using FIG. 4. The inputted optical signal is converted to electrical signal by the CCD sensor 308. The CCD sensor 308 is an R, G and B three lines color sensor and each RGB image signal is inputted to an A/D converter unit 401. Here, after gain adjustment and offset adjustment, each color signal is converted to 8-bit digital image signals R0, G0 and B0 by the A/D converter. Then in a shading correction unit 402, using a signal read from a white calibration standard, a known shading correction is applied to each color. Further, since each color line sensor of the CCD sensor 308 are placed mutually separated by a fixed distance, the spatial offset of sub-scanning direction is corrected by a line delay control circuit (line interpolation unit) 403.

Then an input masking unit 404 is a unit which converts the reading color space determined by the optical characteristics of the R, G and B filters of the CCD sensor 308 to the NTSC standard color space, and converts the inputted signals (R0, G0 and B0) to standard signals (R, G and B) by performing a 3×3 matrix calculation which uses characteristic constants of the devices, taking into account various characteristics such as the sensitivity characteristics of the CCD sensor 308, the spectral characteristics of the illuminating lamp and the like.

Further, a luminance/density conversion unit (LOG conversion unit) 405 is formed by a look up table (LUT) RAM and allows the conversion of luminance signals of R, G and B into density signals of C1, M1 and Y1.

Numeral 406 is an output masking/UCR CKT unit, which is a unit that uses matrix calculation to convert M1, C1 and Y1 signals into Y, M, C and K signals, the toner colors of the image formation apparatus. The output masking/UCR CKT unit 406 corrects C1, M1, Y1 and K1 signals, which are based on the R, G and B signals read in by the CCD sensor 308, into C, M, Y and K signals, which are based on the spectral distribution of the toner, and outputs them.

Then a gamma correction unit 407 uses the look up table (LUT) RAM which takes into account various characteristics of toner colors, to convert into C, M, Y and K data, for image output. In a spatial filter 408, after sharpness or smoothing is applied, the image signal is sent to the core unit 206.

In case a monochrome image processing is to be performed by the MFP 105, after A/D conversion and shading of a single color using a single color 1 line CCD sensor, the order in which to process with input and output masks, gamma conversion and spatial filter is indifferent.

(Structure of the FAX Unit 203)

Figure 5:
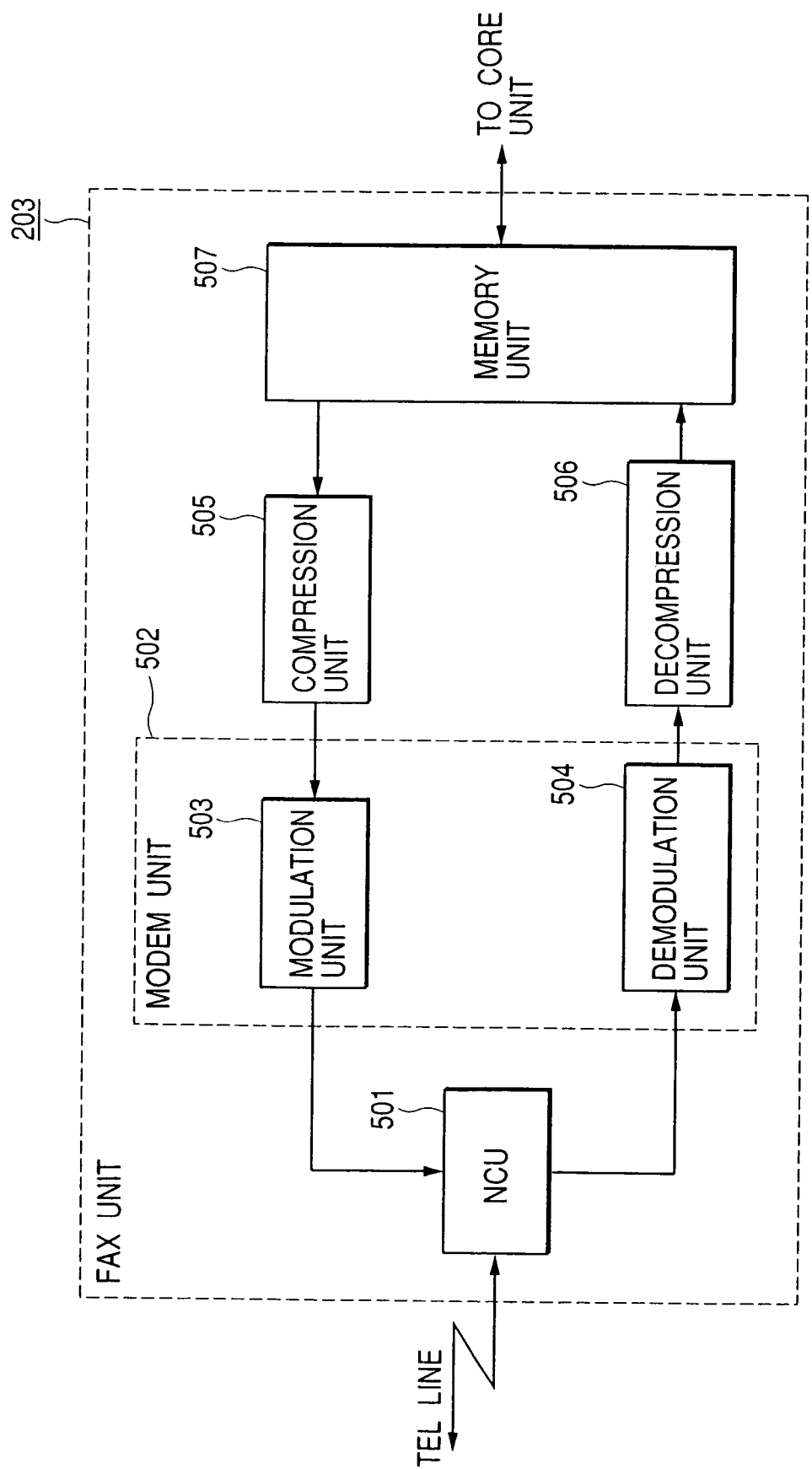
FIG. 5 is a block diagram of a FAX unit of the image formation apparatus.

The structure of the FAX unit 203 will be explained using FIG. 5. First, when receiving, a conversion is performed by an NCU unit 501, of the voltage received from data incoming from the telephone line. After A/D conversion and demodulation processing have been performed by a demodulation unit 504 inside a modem unit 502, a development into raster data is performed in a decompression unit 506. Generally, compression and decompression by the FAX uses the run length method or the like. The image converted to the raster data is temporarily stored in a memory unit 507, and sent to the core unit 206 after verifying that the image data has no transmission errors.

Then when transmitting, in a compression unit 505, compression such as the run length method is applied to a raster image signal which came from the core unit, after D/A conversion and the demodulation processing have been performed by a modulation unit 503 inside the modem unit 502, the signal is sent to the telephone line through the NCU unit 501.

(Structure of the NIC Unit 204)

Figure 6:
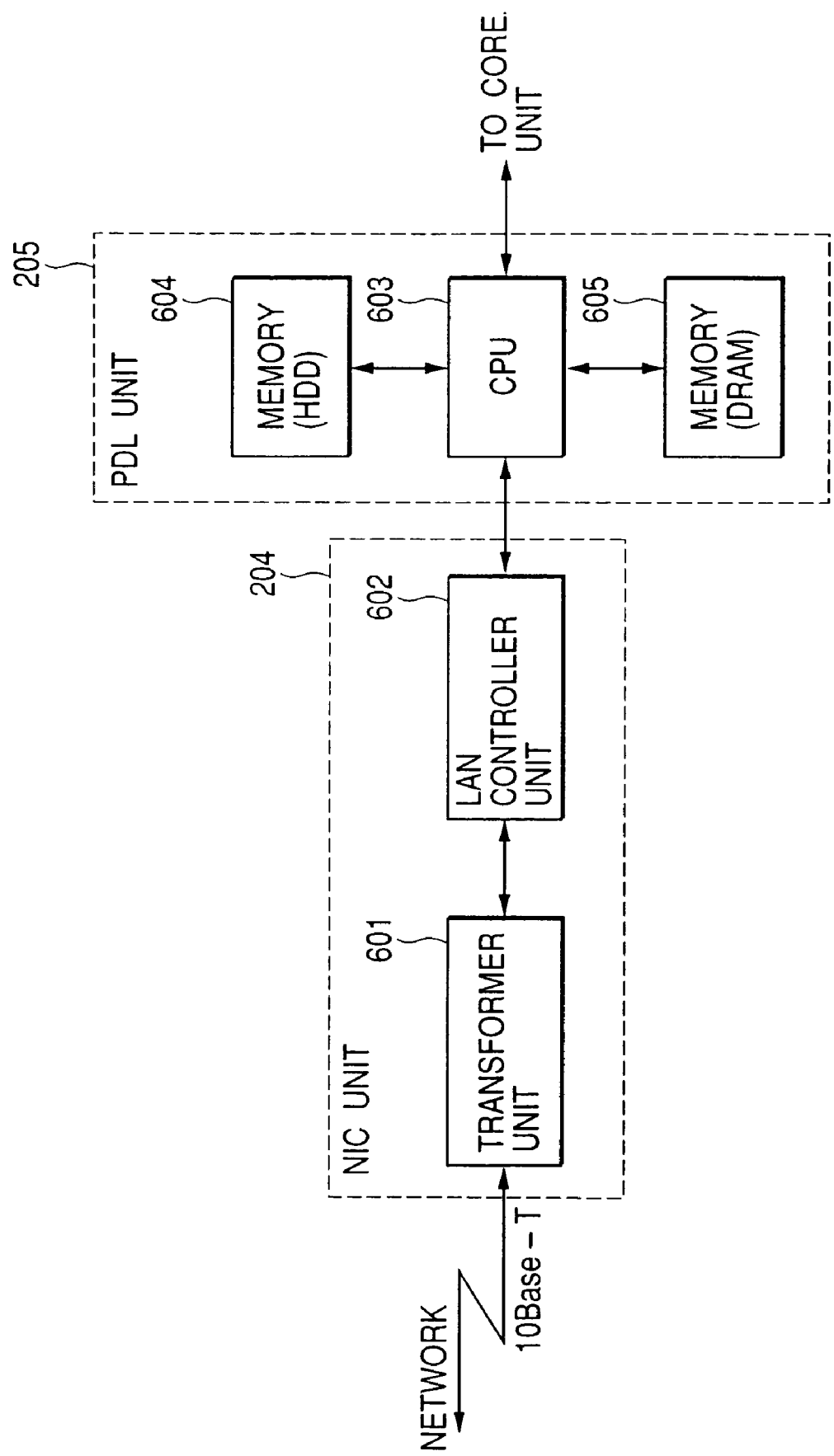
FIG. 6 is a block diagram of a NIC unit and a PDL unit of the image formation apparatus.

The structure of the NIC 204 will be explained using FIG. 6. The NIC unit 204 functions as an interface to the network 101 and plays the role of taking information from the outside and giving information to the outside by using Ethernet cables such as 10Base-T/100Base-TX for example.

In the case information is being taken from the outside, the voltage is first converted by a transformer unit 601 and sent to a LAN controller unit 602. The LAN controller unit 602 has a first buffer memory (not shown in the figure) inside, and after judging whether the information is needed or not, sends it to a second buffer memory (not shown in the figure) and sends the signal to the PDL unit 205.

Then in the case information is to be submitted outside, necessary information is added by the LAN controller unit 602 to the data sent by the PDL unit 205, and connected to the network 101 through the transformer unit 601.

(Structure of the PDL Unit 205)

Then the PDL unit 205 will be explained using the same FIG. 6. The image data created with software applications running on the computer 103 is formed by texts, figures and photographs, each of which are made by combining image description elements such as text code, graphic code and raster image data. This is the so-called PDL (Page Description Language) of which Adobe's PostScript (trade mark) language is a representative.

The PDL unit 205 performs the conversion processing of the above-mentioned PDL data into the raster image data. First, the PDL data sent by the NIC unit 204 goes through a CPU unit 603 and is stored once on a high capacity memory 604 such as a hard disk (HDD), and is managed, stored for each job. Then according to the need, the CPU unit 603 performs a rasterizing image processing called RIP (Raster Image Processing) and develops the PDL data into a raster image. The developed raster image data is stored for each CMYK color component, in a memory 605 allowing high speed access such as DRAM by page unit for each job and according to the status of the printer unit 208, is sent through the CPU unit 603 again to the core unit 206.

(Structure of the Core Unit 206)

Figure 7:
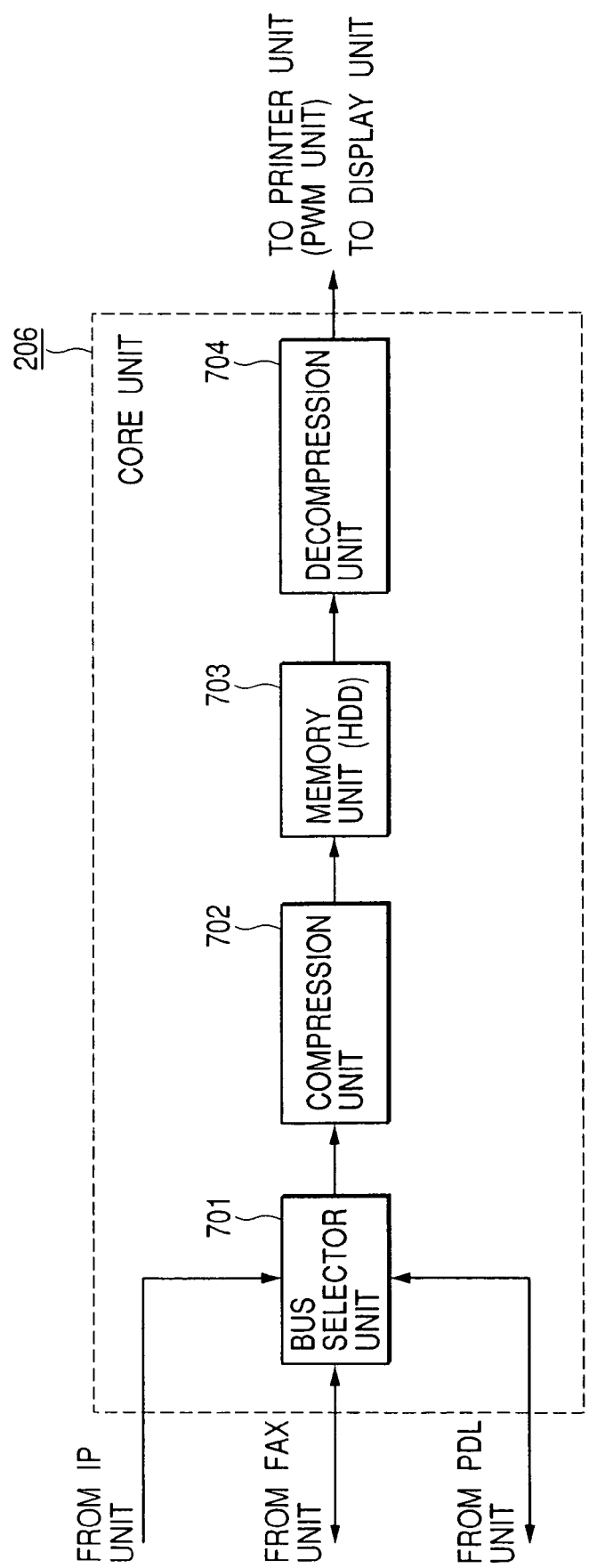
FIG. 7 is a block diagram of a core unit of the image formation apparatus.

The core unit 206 will be explained using FIG. 7 A bus selector unit 701 of the core unit 206 bears the role of traffic control through the use of the MFP's 104 and 105. In other words, it is the place where bus switching is performed by the MFP's 104 and 105 according to each function type such as photographic function, network scan, network print, facsimile transmission/reception or display.

Shown below are the bus switching patterns for performing each function.
photographic function:
　　scanner 201→core 206→printer 208
network scan:
　　scanner 201→core 206→NIC unit 204
network print:
　　NIC unit 204→core 206→printer 208
facsimile transmission function:
　　scanner 201→core 206→FAX unit 203
facsimile reception function:
　　FAX unit 203→core 206→printer 208
display function:
　　scanner 201 or FAX unit 203 or NIC unit 204→core 206→display 210

Then the image data exited from the bus selector unit 701 is sent to a compression unit 702, a memory unit 703 made of high capacity memory such as hard disks (HDD) and, through a decompression unit 704, to the printer unit 208 (PWM unit 207) or the display unit 210. Compression methods used in the compression unit 702 can be general such as JPEG, JBIG, ZIP or the like. Compressed image data is managed for each job and stored together with additional data such as file name, author, creation date, file size.

Further, by creating job numbers and passwords and storing them as well, it is possible to support personal box function. It is a function which provides a temporary storage of data or allow the print out (reading from the HDD) to only specific people. If the instruction to print out is issued, after verification of the password, the data is recalled from the memory unit 703, goes through image decompression, is reverted to the raster image and sent do the printer unit 207.

(Structure of the PWM Unit 207)

Figure 8A:
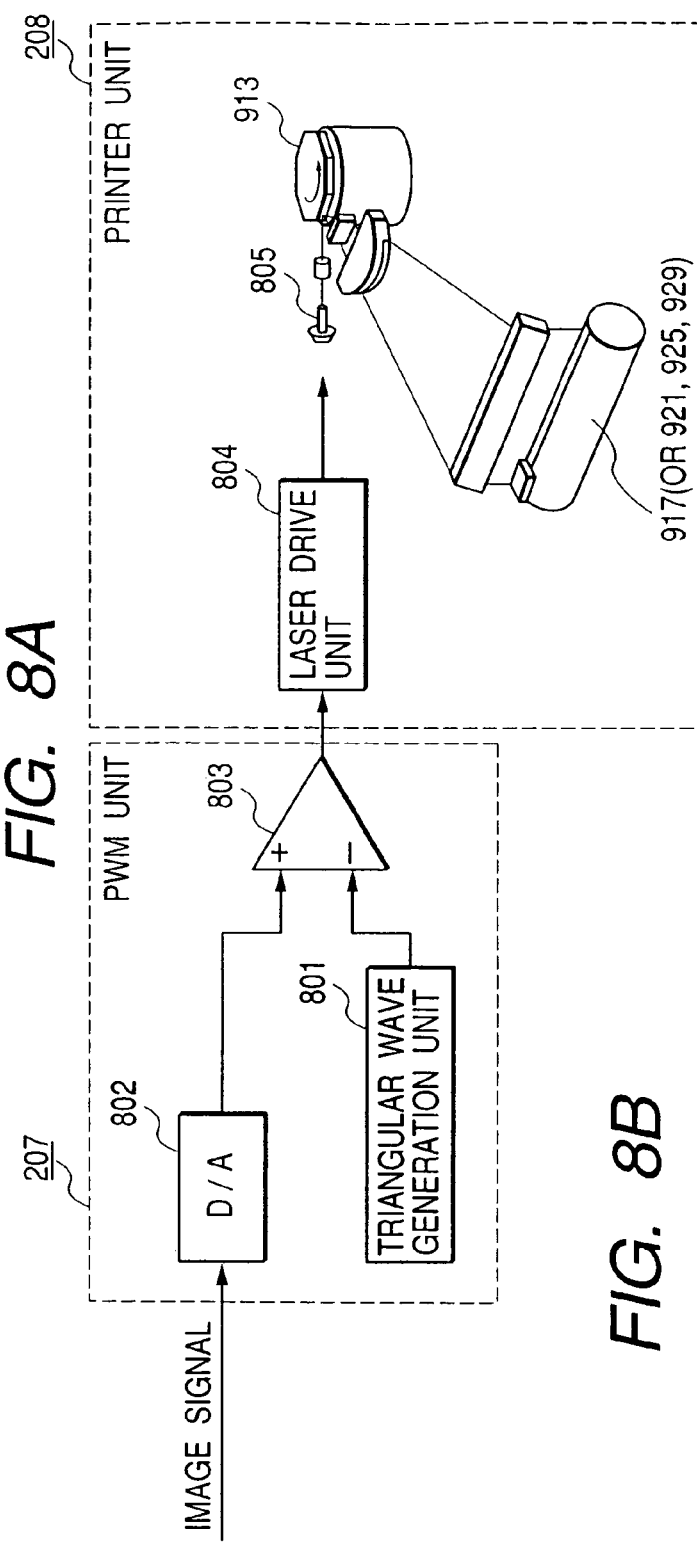
FIGS. 8A and 8B are respectively a block diagram and a timing chart of a PWM unit of the image formation apparatus.
Figure 8B:
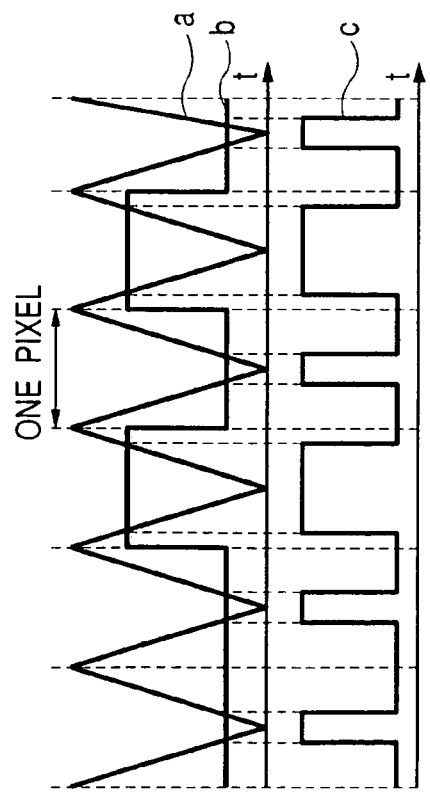

The PWM unit 207 will be explained using FIGS. 8A and 8B. In the case of image data that underwent a four colors separation into yellow (Y), magenta (M), cyan (C) and black (K) (single color in the case of MFP 105) and exited the core unit 206, each goes through respective PWM unit 207 and an image is formed for each. Numeral 801 is a triangular wave generation unit, numeral 802 is a D/A converter which converts the digital image signal into an analog signal. A signal from the triangular wave generation unit 801 (signal a in FIG. 8B) and a signal from the D/A converter 802 (signal b in FIG. 8B) are compared in a comparator 803 and are sent in a form such as a signal c to a laser drive unit 804, and each CMYK is converted to laser beam with each CMYK laser 805.

Then a polygon scanner 913 scans each laser beam and expose each photosensitive drums 917, 921, 925 and 929.

(Structure of the Printer Unit 208 (in the Case of Color MFP 104))

Figure 9:
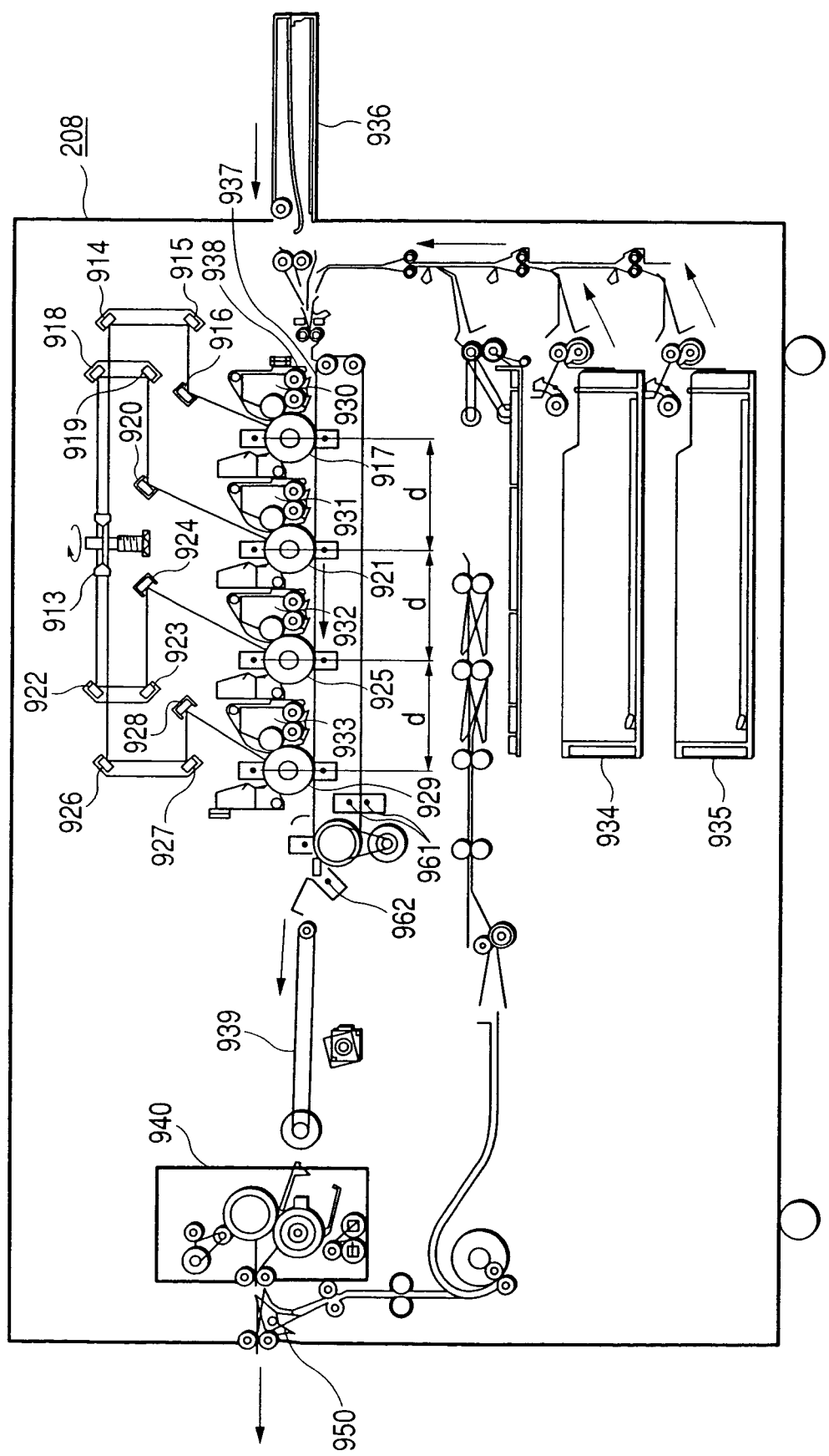
FIG. 9 is a view showing a printer unit of a color image formation apparatus.

FIG. 9 shows the outline of the color printer unit. Numeral 913 is a polygon mirror and receives four laser beams emitted from four semiconductor lasers 805. One among them scans the photosensitive drum 917 via mirrors 914, 915 and 916, the next one scans the photosensitive drum 921 via mirrors 918, 919 and 920, the next one scans the photosensitive drum 925 via mirrors 922, 923 and 924, the next one scans the photosensitive drum 929 via mirrors 926, 927 and 928.

On the other hand, numeral 930 is a development unit which supplies yellow (Y) toner creating a yellow toner image on the photosensitive drum 917 following the laser beam, numeral 931 is a development unit which supplies magenta (M) toner creating a magenta toner image on the photosensitive drum 921 following the laser beam, numeral 932 is a development unit which supplies cyan (C) toner creating a cyan toner image on the photosensitive drum 925 following the laser beam, numeral 933 is a development unit which supplies black (K) toner creating a black toner image on the photosensitive drum 929 following the laser beam. The above four colors (YMCK) toner images are transferred to the sheet, providing a full color output image.

Sheets paper-fed from either cassettes 934 and 935, or a manual loading tray 936, are, via a resist roller 937, absorbed to a transfer belt 938, and conveyed. Synchronized with the paper-feeding timing, each color toner is developed in advance on the photosensitive drums 917, 921, 925 and 929, and while the sheets are being conveyed, the toner images are transferred onto the sheets. The sheets on which each color toner image has been transferred are separated, conveyed by a conveying belt 939 and the toner is fixed onto the sheets by a fixing unit 940. The sheets which exited the fixing unit 940 are temporarily guided downwards by a flapper 950 and when the rear edge of the sheets exits the flapper 950, the sheets are switched back and discharged. Thus, the sheets are discharged face-down to provide a correct page order when printing successively from the cover page.

Further, the four photosensitive drums 917, 921, 925 and 929 are separated by a distance d and positioned at each interval, the sheets are conveyed by the conveying belt 939 at a constant speed V such that the above timing synchronization is achieved to drive the four semiconductor lasers 805.

(Structure of the Printer Unit 208 (in the Case of the Monochrome MFP 105))

Figure 10:
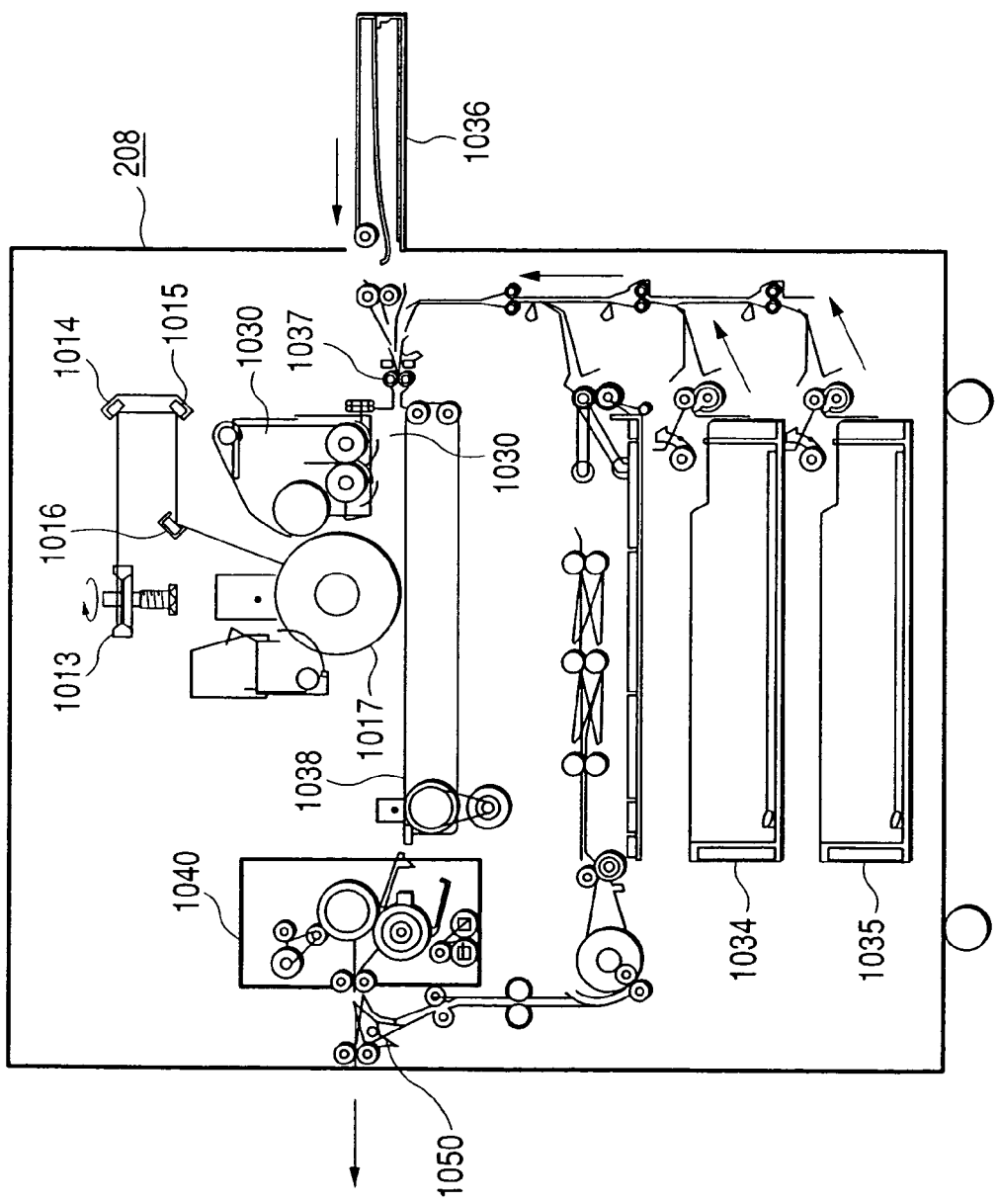
FIG. 10 is a view shows a printer unit of a monochrome image formation apparatus.

FIG. 10 shows the outline of the monochrome printer unit. Numeral 1013 is a polygon mirror and receives the four laser beams emitted by the four semiconductor lasers 805. The laser beams scan a photosensitive drum 1017 via mirrors 1014, 1015 and 1016. On the other hand, numeral 1030 is a development unit which supplies black and white toner creating a toner image on the photosensitive drum 1017 following the laser beam, the toner image is transferred to the sheet, providing an output image.

Sheets paper-fed from either sheet cassettes 1034 or 1035, or a manual loading tray 1036, are, via a resist roller 1037, absorbed to a transfer belt 1038, and conveyed. Synchronized with the paper-feeding timing, the toner image is developed in advance on the photosensitive drum 1017, and while the sheets are being conveyed, the toner images are transferred onto the sheets. The sheets on which the toner images have been transferred are separated, and the toner is fixed onto the sheets by a fixing unit 1040. The sheets which exited the fixing unit 1040 are temporarily guided downwards by a flapper 1050 and when the rear edge of the sheets exits the flapper 1050, the sheets are switched back and discharged. Thus, the sheets are discharged face-down to provide a correct page order when printing successively from the cover page.

(Structure of the Display Unit 210)

Figure 11:
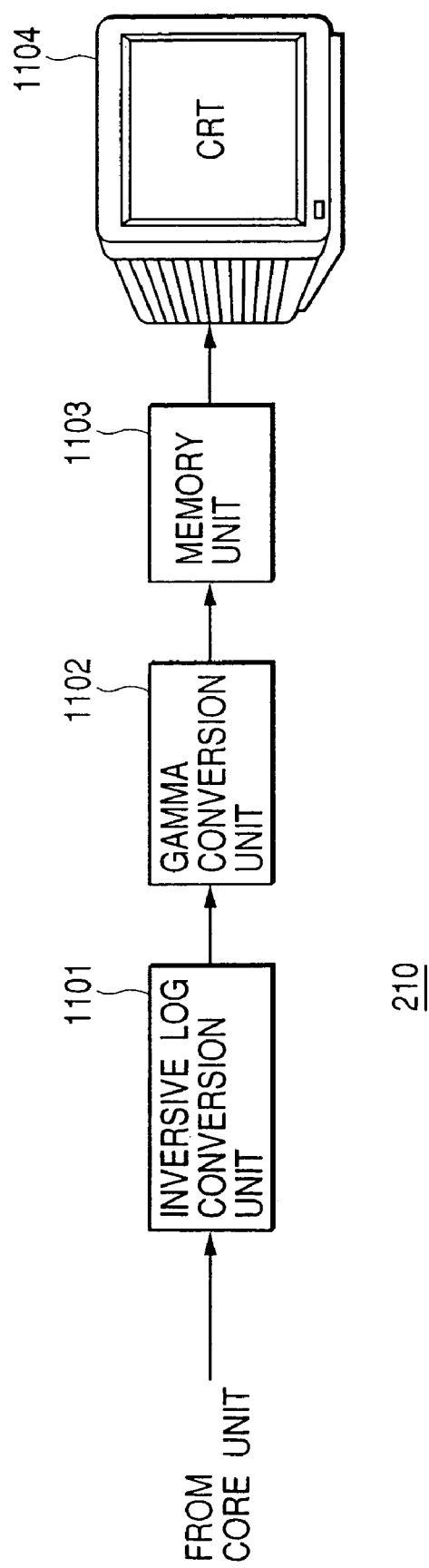
FIG. 11 is a block diagram of a display unit of the image formation apparatus.

The display unit 210 is shown in FIG. 11. Since the image data outputted from the core unit is CMYK data, it is necessary to perform a transformation into RGB data with an inversive LOG conversion unit 1101. Then using a look up table in a gamma conversion unit 1102, an output conversion is performed to conform to color characteristics of outputting display unit 1104 such as CRT or the like. The converted image data is temporarily stored in a memory unit 1103 and displayed by the display unit 1104 such as CRT or the like.

Here, the display unit 210 is used for a preview function, to verify in advance the images to be printed, a proofing function, to confirm that the images are the ones intended to be printed, or for preventing waste of sheets by verifying the images that do not need to be printed.

(Structure of the Finisher Unit 209)

Figure 12:
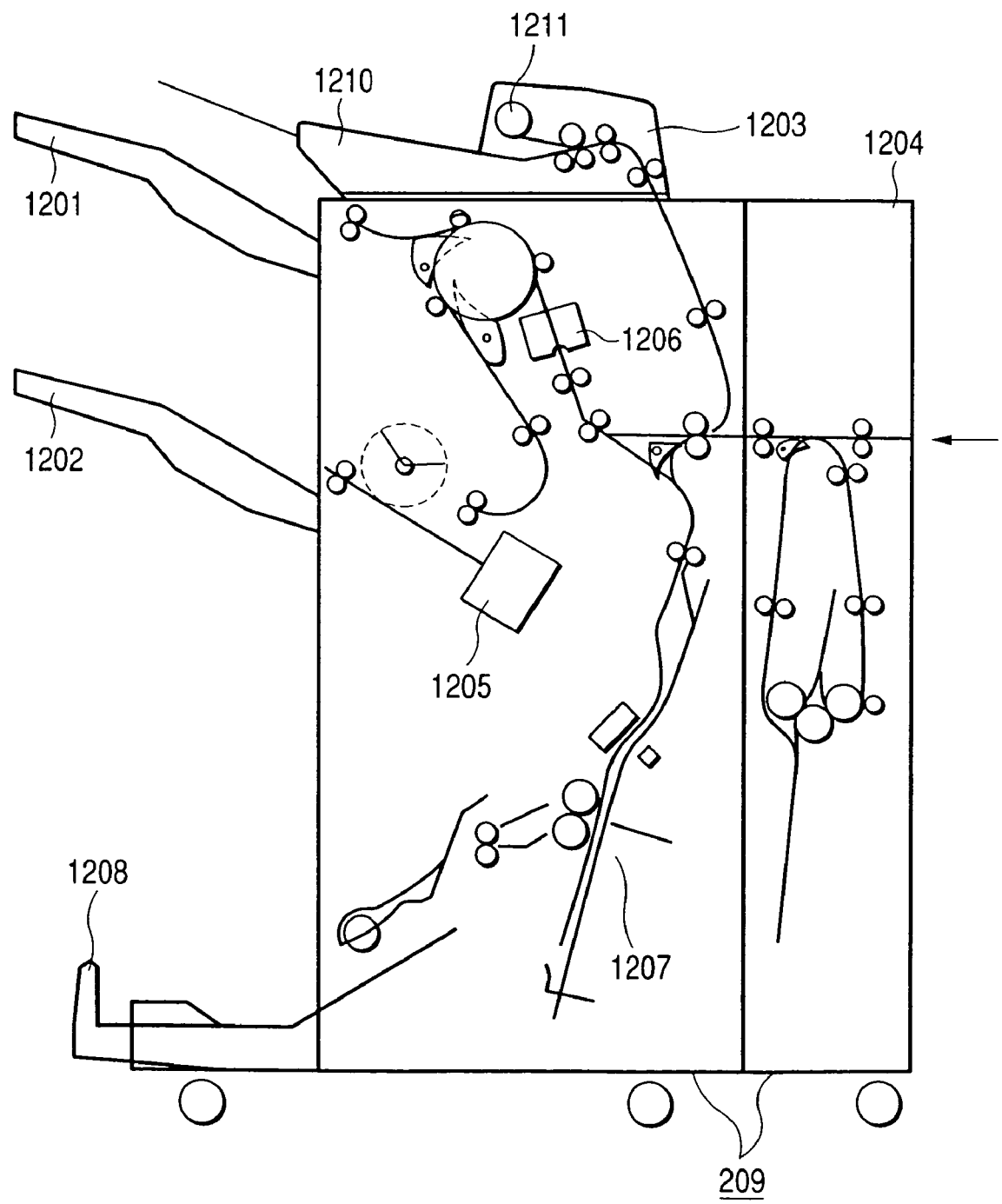
FIG. 12 is a view showing a finisher unit of the image formation apparatus.

The outline of the finisher unit is shown in FIG. 12. The sheets which have exited the fixing unit 940 (or 1040) of the printer unit 208 enters the finisher unit 209. The finisher unit 209 has a sample tray 1201 and a stack tray 1202 and can switch and discharge sheets according to the type of the job or the number of the sheets to be discharged.

There are two sorting methods. Sorting can be performed using a bin sorting method which consists in having several bins and partitioning the outputted sheets to each bin, or using a shift sorting method, in which the outputted sheets are partitioned by an electronic sorting function mentioned hereafter and shifting of the bin (or the tray) from back to front for each job. The electronic sorting function is called as collate and electronic sorting function can be supported provided the large memory mentioned above in the core part, by using the buffer memory, altering the order of the buffered pages and the requests for discharging, that is, by using the collate function. Then in contrast to sorting which partitions at each job, a group function is a function which assorts each page.

Furthermore, when discharging to the stack tray 1202, it is possible for each job to bind the sheets to the sheets stored before discharging, using a stapler 1205.

In addition, before reaching the above-mentioned two trays, a Z-folding apparatus 1204, which holds paper into the Z-letter-shape, and a puncher 1206, which punches two (or three) holes for files, perform processing according to the types of the jobs.

Furthermore, a saddle stitcher 1207 performs processes by binding the sheets at two locations in their middle and folding the sheets in two halves by engaging the sheets into the roller by their middle, and booklets such as journals or leaflets are produced. The book-made sheets produced by the saddle stitcher 1207 are discharged to a booklet tray 1208.

In addition, although not shown in the figure, it is possible to consider adding binding with glue used to make books, or cutting of the bound or the opposite edge to make them uniform.

Also, an inserter 1203 sends the sheets set to a tray 1210 to any of the trays 1201, 1202 or 1208 without passing through the printer. Thus, sheets set in the inserter 1203 can be inserted between the sheets sent into the finisher 209. The tray 1210 of the inserter 1203 is set in the face-up configuration by the user, and the sheets are fed one after another from the topmost sheet by a pickup roller 1211. Therefore, the sheets from the inserter 1203 are conveyed directly to the trays 1201 and 1202, such that they are discharged in the face-down configuration. When sending into the saddle stitcher 1207, the orientation of the sheet faces are matched by sending once to the puncher 1206 and switched back before sending in.

(Separation of Jobs)

In the following, the separation of jobs between the color image and monochrome image will be explained. When printing a job from the computers 103 and 102, where color pages and black/white pages coexist inside one job, the job is first transferred to the color MFP 104 through the network 101, using a software driver running on the computers 102 and 103 as in FIG. 13. Here, numeral 1301 is a driver window shown on the displays of the computers 102 and 103, in which the setting items are as follows: numeral 1302 is a color printer selection column where selection of the color printer (color MFP 104) is performed, numeral 1303 is a monochrome printer selection column where selection of the monochrome printer (black/white MFP 105) is performed, numeral 1304 is a page setting column which selects the output pages in a job, numeral 1305 is a copy number setting column which designates the number of copies, numeral 1306 is a job color mode column which instructs the separation of color and black/white images for jobs where color coexist with black/white, numeral 1307 is an OK key which starts the printing, numeral 1308 is a cancel key which abandons the printing and numeral 1309 is a property key which performs additional detailed settings.

Here, the job color mode column 1306 is capable of selecting one mode among automatic separation, manual separation, all color pages or all black/white pages. In the case of manual separation, for each page, the user can select from which MFP (color MFP 104 or black/white MFP 105) to discharge.

(Automatic Separation of Jobs and Judgment Between Color and Black/White)

Figure 13:
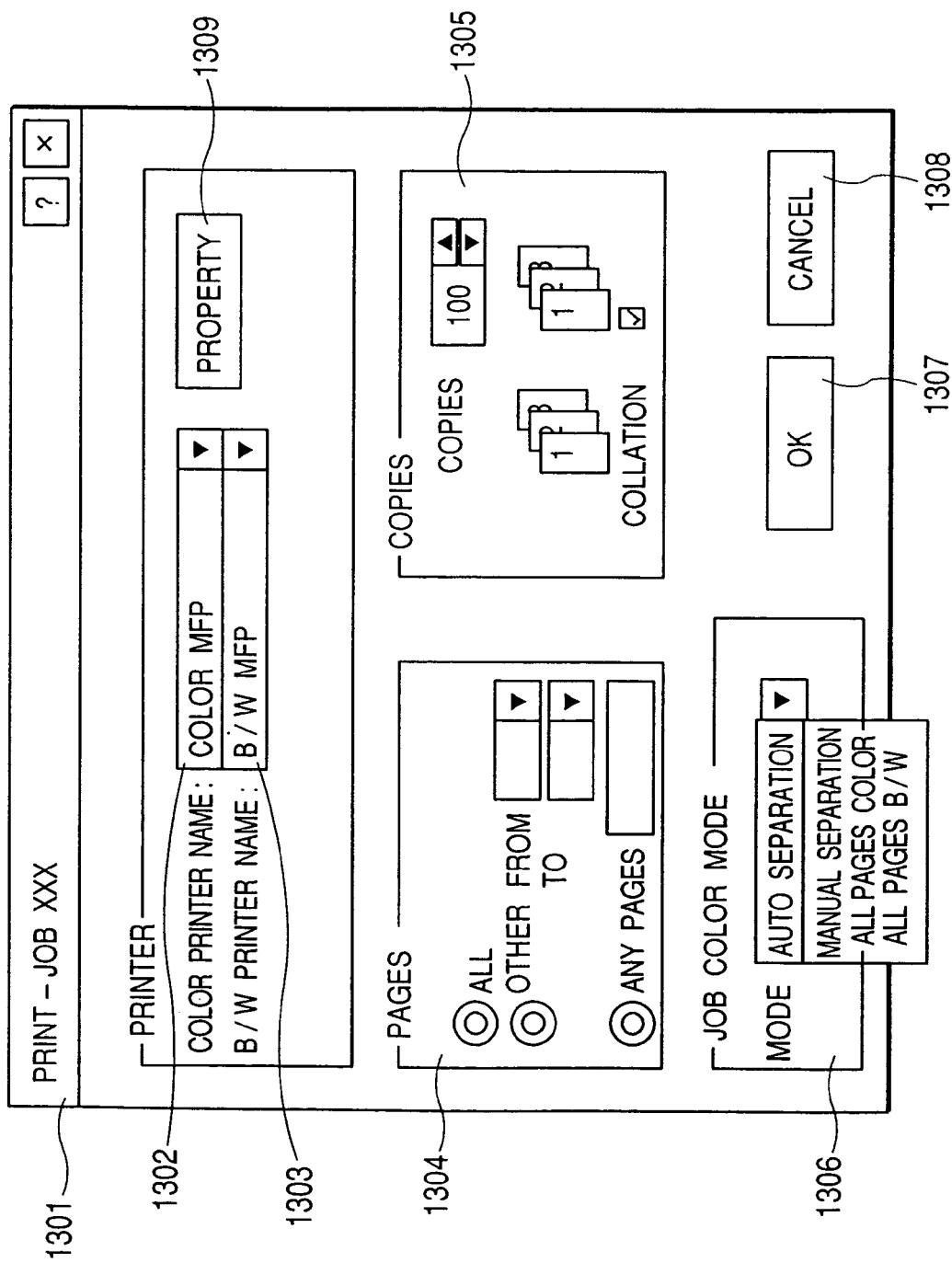
FIG. 13 is a view showing an example of a screen of a printer driver.

In the following, the automatic separation will be explained using FIG. 14. When the OK key 1307 is pressed in the driver window 1301, the driver on the computer 103 sends the information indicating that the job has coexisting color pages and black/white pages and the print job to both of the color MFP 104 and the black/white MFP 105, through the computer (server) 102. In the case of the automatic separation, since it is not possible at this time to judge which pages are black/white pages, the job content for all pages are sent to each of the color MFP 104 and the black/white MFP 105 (i.e., the identical data content are transmitted to both). The sequence by which the color pages and the black/white pages are sent can be in the order of the color MFP then the black/white MFP with a time offset, or it is indifferent to send them simultaneously to both MFP'S. Further, if the mode selected in the column 1306 of the display shown in FIG. 13 is the manual separation, the computer 103, transmits only color data to the MFP 104 and only black/white data to the MFP 105, through the server 102.

Further, the black/white MFP, when receiving the information indicating that color pages and black/white pages coexist in the job, does not start printing immediately but awaits the setting of the color pages described hereafter.

Then if the job is set to the automatic separation (Auto Separation)(step 1401), the setting content of the sampling cycle is sent to the color MFP 104 (step 1402). However, the setting of the sampling cycle is performed in advance in the detailed settings window called with the property key 1309 on the display shown in FIG. 13. Regarding the sampling cycle, by sampling with a ratio of one point per 100 pixels×100 lines, the sampling time is complete in $\frac{1}{10000}$, for a 400 dpi image, considering sampling with a lattice unit of 0.25 inch (=6.35 mm) cycle, even of a letter size (11"×8.5") sheet, if close to 1500 point, judging between color and black/white is possible to some degree. In the case the images is still difficult to judge, the sampling cycle can be set to a finer value, or the job color mode column 1306 can be set to the manual separation (Manual Separation) and manually set which pages are in color and which are in black/white, in advance, in the detailed setting window.

Then the PDL unit 205 of the color MFP 104 which received the job and the sampling cycle performs successively from the front page successive raster image processing (RIP), and after the RIP, the images are stored for each page unit and for each color component (CMYK) in the semiconductor memory 605. The CPU 603 then judges whether the stored images are in color or in black/white (step 1403). The judgment is performed by assessing the presence or the absence of components other than black (K) (CMY components) for each sample point in the semiconductor memory 605 (steps 1404 and 1405). While doing so, to increase the processing speed, if a color (CMY) component is present in a single sampling point of the page, since the page is a color image, the judgment between color and black/white is interrupted at that point in time and the page is processed as a color page inside the color MFP 104. At this time, the possibility exists, to reprint the job, so the page number information of the page, together with the information that the page is a color page is used to notify the server 102 through the network 101 (step 1409). Then the page is color printed at the color MFP 104 (step 1410). Further, the server 102 records and manages each page number information to be able to output at any time in response to re-outputting request from an user.

In the step 1405, if the color (CMY) components do not exist even for a single point in the sampling points in the page, the page is to be processed by the black/white MFP 105 as a black/white page, and the page number information together with the information indicating that the page is the black/white page are used to notify the server 102 and the black/white MFP 105, through the network 101 (step 1411).

The black/white MFP 105 which received notification in the step 1411 awaits the beginning of printing until the color pages printed by the color MFP 104 are set in the inserter 1203 of the finisher 209. Thus, the image formation processing performed by the color MFP 104 begins in response to the reception of the job data from the computer 103, whereas the image formation processing performed by the black/white MFP 105 does not begin even when receiving the information about each page or the like from the color MFP 104, but begins in response to the setting of the sheets in the inserter 1203 of the black/white MFP 105. This eliminates the possibility that the black/white MFP 105 is occupied, due to a careless start of the image formation processing of the job, regardless of the fact that there is no user for the job on the black/white MFP 105 side, and avoids any hinderance in the event other users may use the black/white MFP 105.

The job is repeated until the last page from a step 1403 to a step 1406 and from a step 1409 to a step 1411, and finished (step 1413) by the MFP 104, as long as the interruption by job cancel is not inserted.

In the step 1401, if it is judged that the automatic separation is not set, that is, if it is judged that the manual separation is set, the computer (server) 102 receives information of whether each page is in color or in black/white from the driver and responds by instructing to the color MFP 104 to print the color pages and by instructing to the black/white MFP 105 to print the black/white pages (step 1407). Then the color MFP 104 starts the color printing of the color pages and the black/white MFP 105 holds the start of the printing until the color pages printed by the color MFP 104 are set in the inserter 1203 of the finisher 209.

Thus, in response to whether the mode set by the user in the column 1306 shown on the display of FIG. 13 is the automatic separation setting or the manual separation setting, the data transmission method to each MFP (MFP's 104 and 105) is differentiated. This allows processing according to the user's need to be realized.

For example, when the job involves only a small number of pages, the user can easily designate the color or black/white pages, such that, if the user selects the manual separation setting at a control unit, only color data will be transmitted to the MFP 105, only color data will be transmitted to the color MFP 104 and only black/white data will be transmitted to the black/white MFP 105, from the computer 103, through the server 102. This allows to keep low network traffics, relieve the overall system load and improve efficiency.

On the other hand, for jobs involving a large number of pages, it is difficult for the user to determine and designate for each page whether to use color data or black/white data, such that, if the automatic separation setting is selected at the control unit, the data with the identical content (data in which color pages and black/white pages coexist) is transmitted to both the color MFP 104 and the black/white MFP 105 through the server 102. This allows to relieve the load over the user and besides, also in this case, in the end, since the operations that the user is required to perform in the manual selection setting such as page designation or the like can be omitted, the overall processing time required to complete the mixed page processing mentioned hereafter can be shortened for the equivalent amount of time.

Further, in the above-mentioned explanation, the explanation is given when the rasterizing is performed sequentially for each page but it is indifferent to temporarily RIP develop an entire job in the high capacity memory (HDD) 604 and sequentially read back and judge each page or several pages in the semiconductor memory 605.

This allows color pages to be printed by the color MFP 104 and the black/white pages to be printed by the black/white MFP 105 from jobs where color pages and black/white pages coexist.

(Automatic Mixing of Jobs)

In the following, the assembling process of the separately outputted color and black/white jobs will be explained. This operation will be named a mixing. Since the judgment of whether the pages are in color or black/white is already performed in the color MFP 104, the black/white MFP 105 need not judge again. Therefore, the black/white MFP 105 RIP develops and prints only the pages notified in the step 1411 of FIG. 14.

Figure 14:
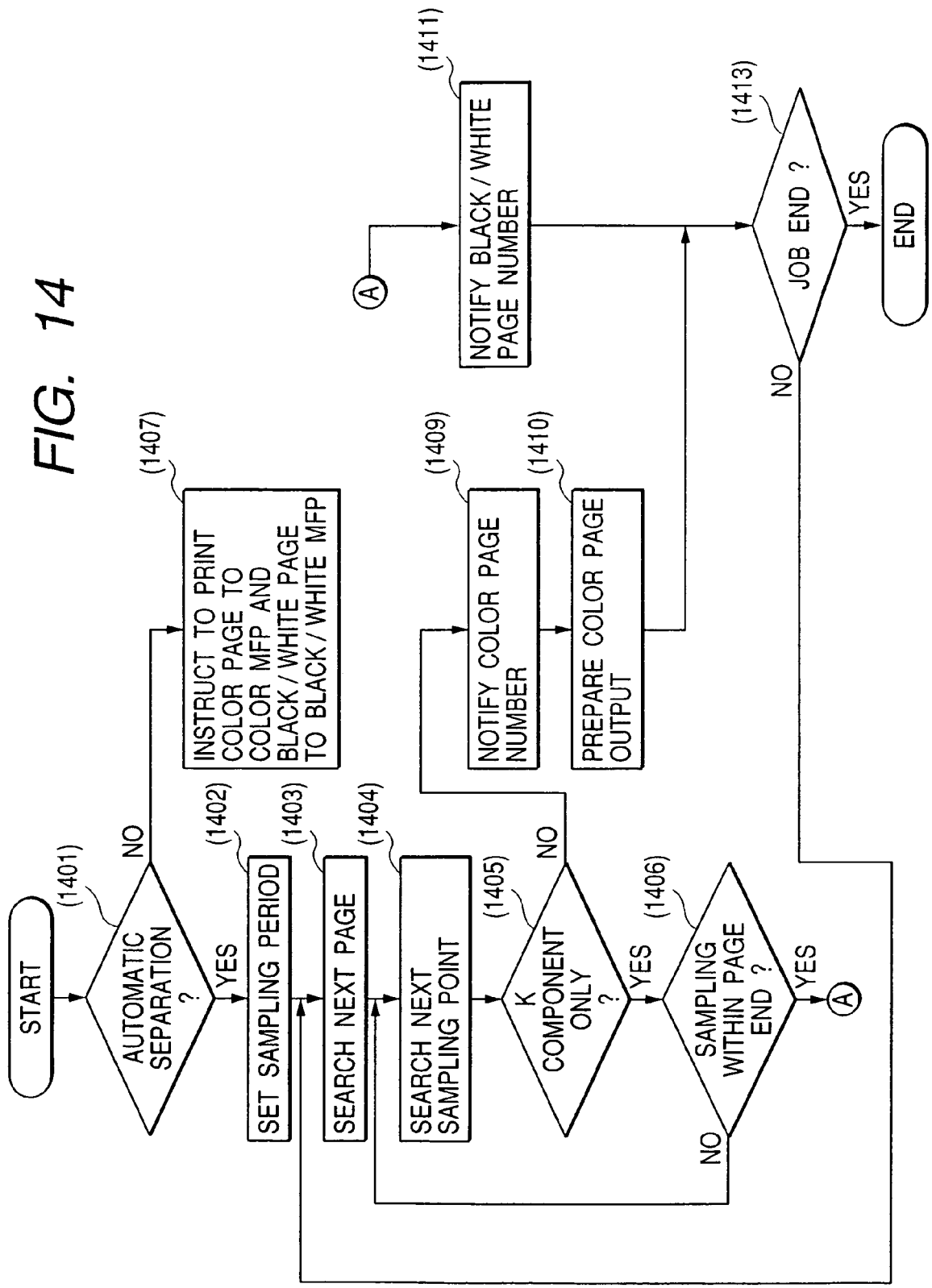
FIG. 14 is a flow chart of separating color pages and black/white pages.
Figure 15:
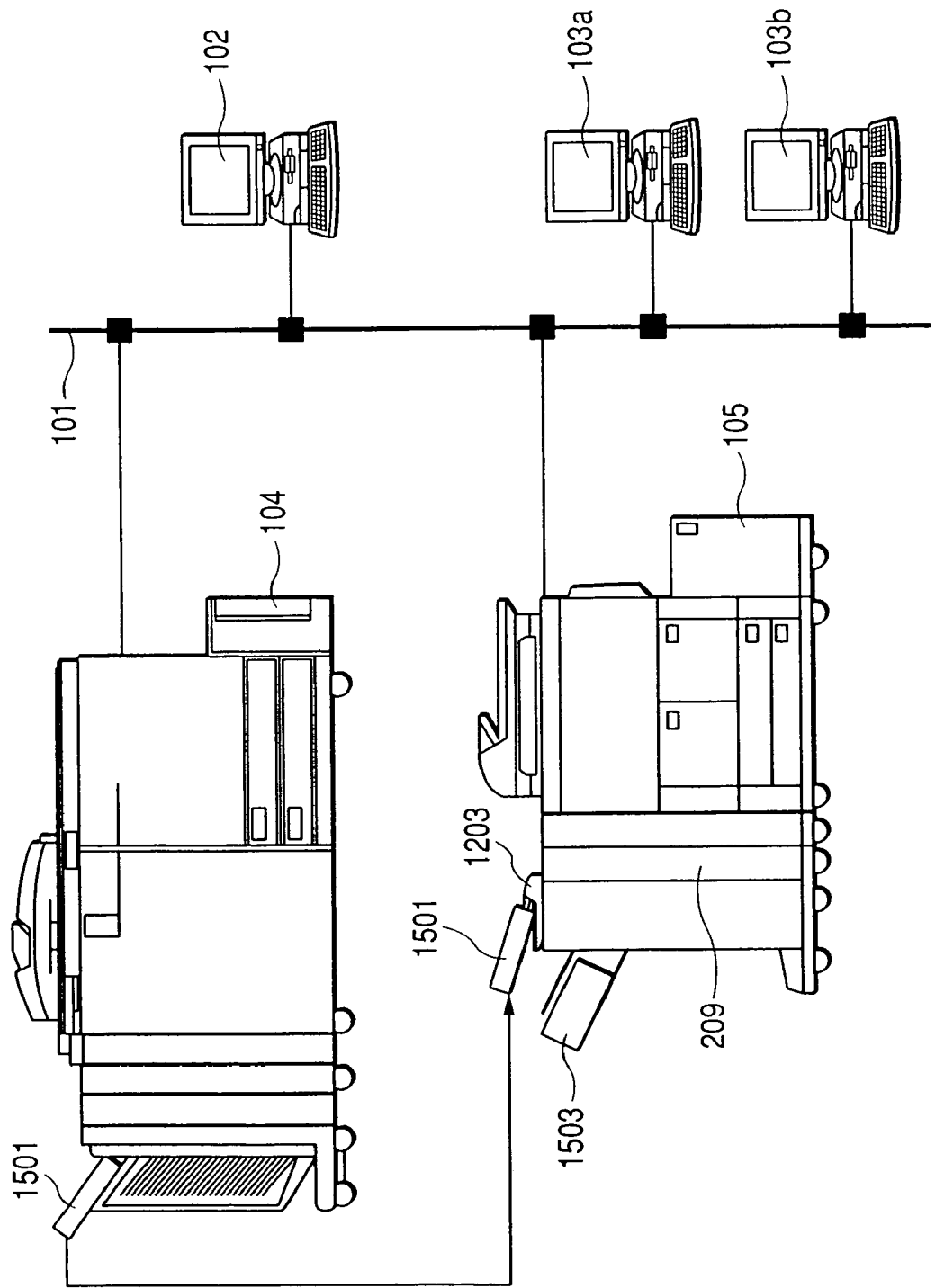
FIG. 15 is a conceptional view of mixing the color pages and the black/white pages.

In this case, as shown in FIG. 15, a sheaf of color pages 1501 printed by the user with the color MFP 104 is set in the inserter 1203 installed on the black/white MFP 105. Here, the sheaf of color sheets 1501 set in the inserter 1203 corresponds to the page numbers notified in the step 1409 of FIG. 14.

Figure 16:
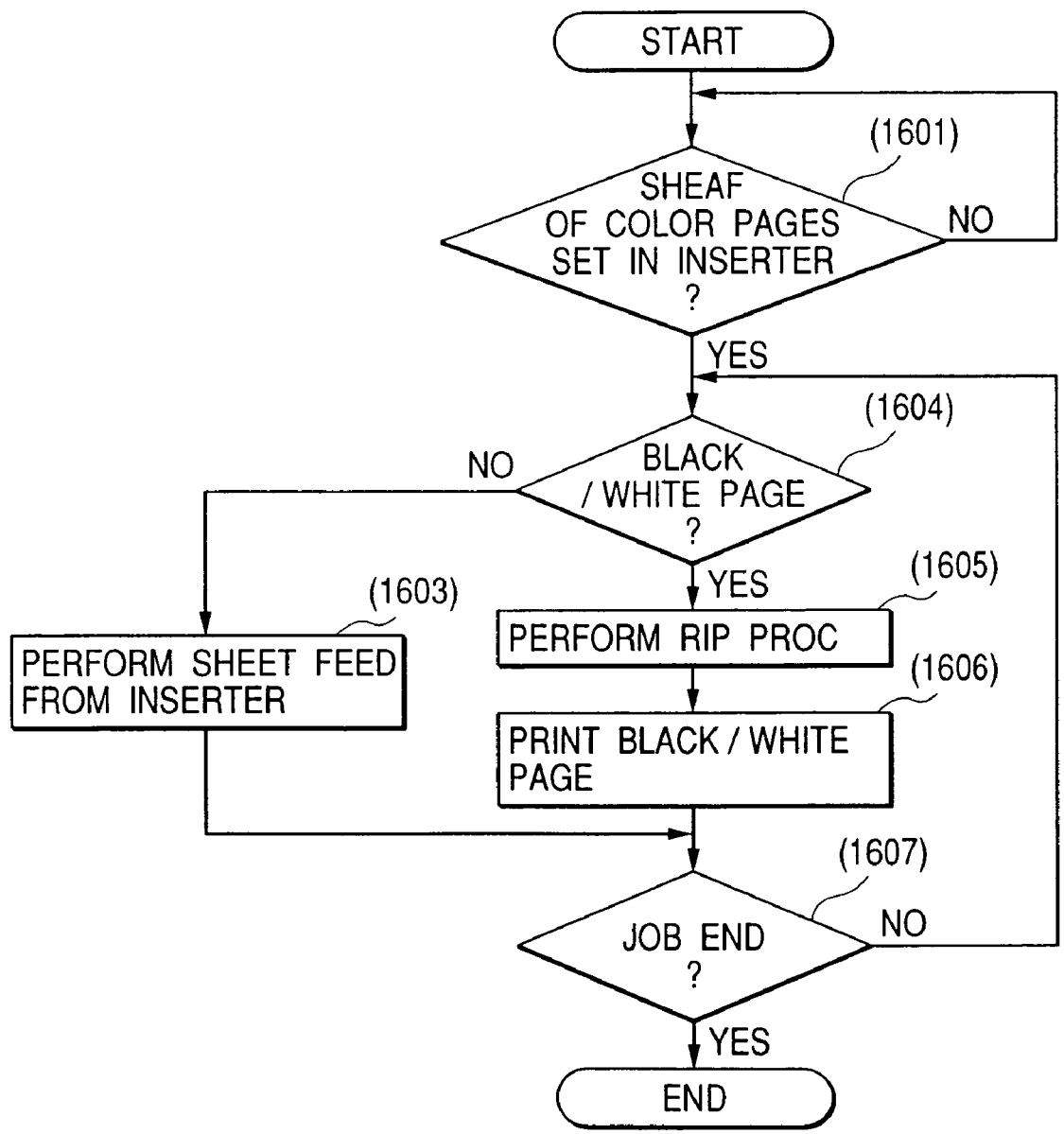
FIG. 16 is a flow chart of mixing the color pages and the black/white pages.

FIG. 16 is a flow chart showing the automatic mixing processing by the black/white MFP 105. First, the MFP 105 waits until the sheaf of color pages is set in the inserter 1203 (step 1601). If the sheaf of color pages is set, sequentially from the front page, it is judged whether the page is a black/white page or not sa notified in the step 1411 and if it is a black/white page, the black/white page is processed by the RIP development (step 1605), processed by black/white printing (step 1406) and discharged in the face-down configuration to the tray. In the case it is judged that the page is not the black/white page, that is, in the case it is judged that the page is a color page, one page is fed from the uppermost part of the sheaf of color pages 1501 in the inserter 1203 (step 1603) and discharged in the face-down configuration to the tray. This process is repeated until the last page for each page (step 1607). By repeating this process until the end of job, a sheaf of job 1503 in which color pages and black/white pages are mixed is discharged to the tray. By using the page number information or the like notified by the color MFP 104, the above allows the control of the timing between the image forming processing by the black/white MFP 105 and the timing of the sheet feeding from the inserter unit 1203.

(Explanations of Network Utility Software)

The utility software which runs on the computers 103 and 102 will be explained. A standardized database called MIB (Management Information Base) is built in the network interface parts (NIC unit 204 and PDL unit 205) of the MFP's 104 and 105 and by communicating with the computers on the network through a network management protocol called SNMP (Simple Network Management Protocol), the MFP's 104 and 105 to begin with, scanners, printers, faxes or the like connected to the network can be managed.

On the other hand, software programs called utilities are running on the computers 103 and 102, and by using the MIB with the above-mentioned SNMP through the network, the needed information can be exchanged.

For example, information about the MFP's 104 and 105 connected to the user network can be identified on the computers 102 and 103, such as detecting whether the finisher 209 is connected or not as equipment information of the MFP's 104 and 105, detecting whether printing is currently possible or not as status information, recording, changing or identifying the names or the localizations of the MFP's 104 and 105, and so on. Further, restriction the reading/writing of the information can be provided by distinguishing the server 102 and the client 103.

Therefore, by using the function, the user can access all sort of information such as the equipment information of the MFP's 104 and 105, the status of the apparatus, the setting of the network, the position of the job, the management and control of the user environment and the like.

(Explanations of GUI)

Figure 17:
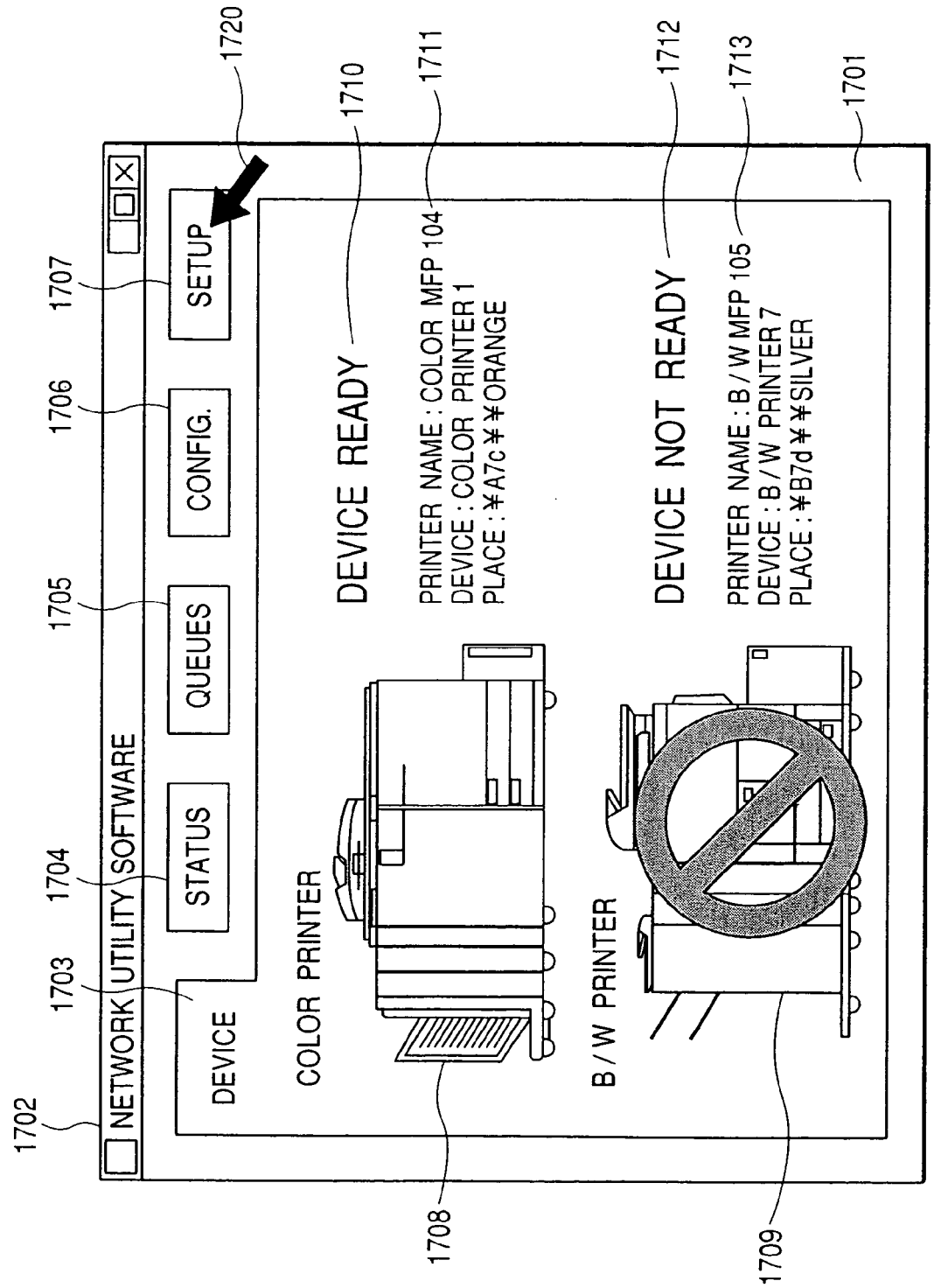
FIG. 17 shows an example of a screen of a utility software.

In the following, the graphic screen of a utility software called GUI (Graphical User Interface) which runs on the computers 103 and 102 will be explained using FIG. 17. When running an utility software on the computers 103 and 102, a graphic screen such as the one in FIG. 17 is shown. Here, numeral 1701 is a window, numeral 1720 is a cursor which when clicked with a mouse opens another window or switched to the next status.

Numeral 1702 is called a title bar and is used to show the level or the title of the current window. Each numeral from 1703 to 1707 is called a tab and is arranged according to its type, allowing to watch or select necessary information.

Here, the numeral 1703 is called a device tab and allows to know the presence of the device and its outline. Bit map images such as numerals 1708 and 1709 showing the MFP's 104 and 105 are in the device tab and messages 1710 and 1711 show what states of the MFP's are. A mechanism consisting in watching a status tab 1704 allows to know the details of the states of the apparatus. Then numeral 1705 is a queue tab and allows to inquire and know the states of the jobs queued in each apparatus or how crowded the devices are.

Then a config tab 1706 allows to know the equipment information such as which functions the installed finisher has. For examples of such information are: a finisher is installed on the MFP 105 and functions possessed by the finisher are stapler, saddle stitcher, folding apparatus, punching apparatus, inserter, a paper deck is installed that can receive up to 5000 sheets and what the remaining quantity of the sheets; a unit to process both sides is installed, and so on.

A setup tab 1707 allows to know network setting information of the apparatus.

(Production of Multiple Copies)

When outputting multiple copies according to the above-mentioned method, all the color pages after the RIP development are stored in the high capacity memory 604, and, for example, in the case three copies of a job from page 1 to page 10 in which pages 1, 3, 5, 7 and 8 are in color have to be produced, a signal is sent in the order (1,3,5,7,8), (1,3, 5,7,8) and (1,3,5,7,8) from the PDL unit 205 to the printer unit 208 of the color MFP 104, to produce the sheaf of color prints 1501 in this order. Then the user sets the sheaf to the inserter 1203.

Then when printing with the black/white MFP 105, pages 2, 4, 6, 9 and 10 are RIP developed and similarly, the developed data of the pages is stored in the high capacity memory 604 of the black/white MFP 105. By following the order (2,4,6,9,10), (2,4,6,9,10) and (2,4,6,9,10), developing, printing, and paper-feeding one by one from the sheaf 1501 set in the inserter 1203 according to the timing of the color pages, three sets of sheaf made of pages 1 to 10 are made. By discharging following the order, a bind processes such as stapler 1005 or saddle stitcher 1007 can be applied to each set in the finisher 209.

Additionally, in the above-mentioned example of embodiment, page mixing is performed by judging whether the pages are in color or black/white with the color MFP 104 and utilizing the inserter connected to the black/white MFP 105, but it is indifferent to invert. That is, a structure where the page mixing is performed by judging whether the pages are in color or black/white with the black/white MFP 105, notifying the color MFP 104 and the server 102 with the page number information together with information showing that the page is a color page, and utilizing the inserter connected to the color MFP 104 will provide the same result.

Also in this case, the image formation processing with the color MFP 104 is held until the sheets processed for the image formation by the black/white MFP 105 is set by the user in the inserter for the color MFP 104, and when the originals are set in the inserter for the MFP 104, based on the page number information or the like received from the black/white MFP 105, the timing of the image formation processing by the color MFP 104 and the timing of the sheet-feeding from the inserter is controlled. For example, if the page is a color page then it is print processed and the print processed sheet is discharged to the tray, if the page is a black/white page then the sheet is fed from the inserter and discharged to the tray. And, this process is performed for each page until the last page.

[Another Embodiment]

In the above-mentioned embodiment, the explanation was given for the structure which performs the mixing using the finisher connected to the black/white MFP 105 or the color MFP 104, but mixing the sheaf of sheets printed by each of the color MFP 104 and the black/white MFP 105 using a finisher not connected to either MFP's allows the simultaneous operation of the color MFP 104 and the black/white MFP 105, such that the time a job occupies the MFP's can be shortened.

Figure 18:
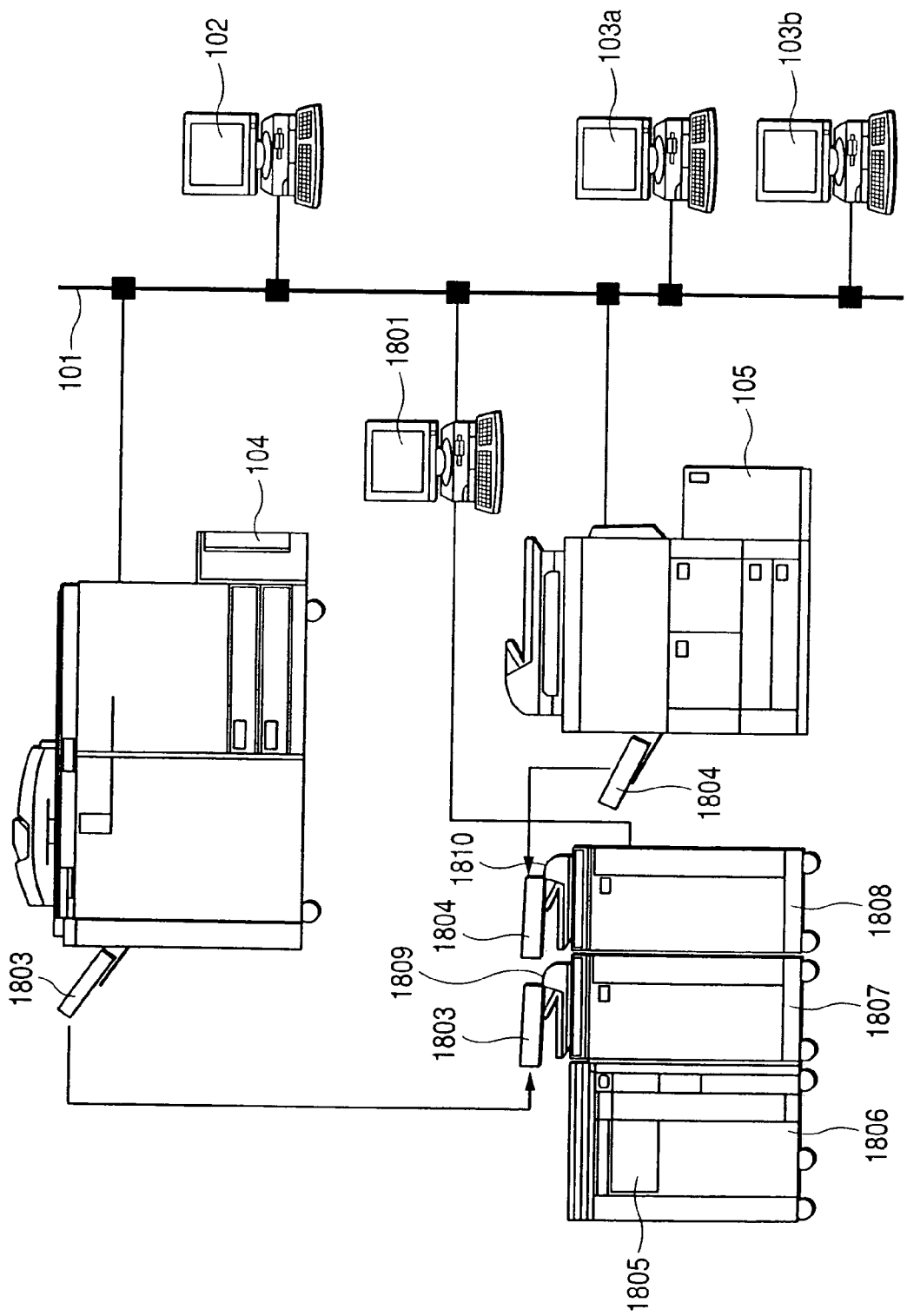
FIG. 18 is a view showing a system of another embodiment.

A computer 1801 controlling finishers 1807 and 1808 is connected to the network 101 as in FIG. 18. When the server computer 102 receives jobs from the client computer 103 in which color pages and black/white pages coexist, it sends the jobs to the MFP 104 and the MFP 105 as mentioned before. Then the MFP 104 prints the color pages while sending the color page number information to the computer 1801. In addition, the MFP 105 prints the black/white pages while sending the black/white page number information to the computer 1801. Based on the information, the computer 1801 determines and shows on the display which sheets printed by the MFP's should be set in each of the finishers 1807 and 1808. Then according to the display, the user sets the outputted prints in the inserter of each of the finishers. FIG. 18 shows the status when the computer 1801 determined to set the sheets outputted by the color MFP 104 in an inserter 1809 of the finisher 1807, and to set the sheets outputted by the black/white MFP 105 in an inserter 1810 of the finisher 1808. The computer 1801 paper-feeds from each of the inserters with a timing based on each information about the color pages or the black/white pages received from the MFP's. The result is the discharge of mixed sheets 1805 to a stacker 1806.

Also, using an inserter with multiple stages, if the computer 1801 instructs which job in a stacker 1811 to set to which stage of the inserter, the extension extends further.

As explained above, according to the present embodiment, an image formation of the color pages inside the job is performed by the MFP 104 and an image formation of the black/white page is performed by the black/white MFP 105, each sheet separated and processed for the image formation by the color MFP 104 and the MFP 105 is mixed to restore the page order of the jobs such that in the case a job containing the color pages and the black/white pages has to be processed for the image formation, without a complicated setting, the image formation can be performed by the color MFP 104 for the color pages and the black/white MFP 105 for the black/white pages, and the pages separated between the color MFP 104 and the black/white MFP 105 for processing of the image formation are produced, sorted automatically in the original page order. Thus, an easy operations allow to exploit the positive aspects of each of the color MFP 104 and the black/white MFP 105, and contributes to the improvement of the productivity when processing the image formation of jobs including color pages and black/white pages.

Moreover, it is evident that realization can be achieved by supplying to either the system or the apparatus, the storage medium on which the program code of the software which realizes functions in the above-mentioned embodiment (for example, job separation processing shown in flow chart of FIG. 14, mixing processing shown in flow chart of FIG. 16, related processing and the like) is recorded, and the computer (or CPU or MPU) of the system or the apparatus reads and executes the program stored inside the storage media.

In this case, it is the program code itself read from the storage media which is to realize the functions of the above-mentioned embodiment and it is the storage media which recorded the program code which is to constitute the current invention.

The storage media used to provide the program code are, for example, floppy disks, hard disks, optical disks, magneto-optical disks, CD-ROM's, CD-R's, magnetic tapes, non-volatile memory cards, ROM and the like.

Also, it is evident that included are the cases where the realization of the functions of the above-mentioned embodiment can be achieved not only by executing the program read from the storage media with the computer, but also by the OS (Operating System) or the like operating on the computers, based on the instructions of the program code, performing part of, or all of the actual processing, and that the processing allows the realization of the functions of the above-mentioned embodiment.

Further, it is evident that included are the cases where, after the program code read from the storage media is written to the memory equipping the extension board of the computer or equipping the function extension unit connected to the computer, based on the instructions of the program codes, the CPU equipping the extension board or the function extension unit performs part of, or all of the actual processing, and that the processing allows the realization of the functions of the above-mentioned embodiment.

In addition, it is evident that, although in the embodiment the explanation is given for examples which adopt the electrophotographic system performed by lasers as the printing mechanism part, without restricting to it, any other printing method may be adopted (e.g., LED printer, thermal transfer printer, inkjet printer or the like).

What is claimed is:

1. An image formation system which includes a first image formation apparatus having a sheet storage unit capable of storing a sheet subjected to printing by a second image formation apparatus, wherein said first image formation apparatus can transport the sheet set in said sheet storage unit, without a printer unit of said first image formation apparatus, said first image formation apparatus can execute a collation process of the sheet from said sheet storage unit and a sheet subjected to printing by said printer unit, and said first image formation apparatus comprises a memory unit adapted to be able to store data of plural jobs capable of being printed by said printer unit, said image formation system further comprising:

a print control unit adapted to cause said printer unit to print the data of said memory unit; and a job control unit adapted to cause said printer unit to be able to execute a printing process of the data, from among the data of said memory unit, of the job for the collation process to the sheet in said sheet storage unit after the sheet was set in said sheet storage unit, and adapted to cause to be able to wait for the printing process of the data, from among the data of said memory unit, of said job and to be able to use said first image formation apparatus for another job when the sheet is not set in said sheet storage unit.

2. A control method for an image formation system which includes a first image formation apparatus having a sheet storage unit capable of storing a sheet subjected to printing by a second image formation apparatus, wherein the first image formation apparatus can transport the sheet set in the sheet storage unit, without a printer unit of the first image formation apparatus, the first image formation apparatus can execute a collation process of the sheet from the sheet storage unit and a sheet subjected to printing by the printer unit, and the first image formation apparatus comprises a memory unit adapted to be able to store data of plural jobs capable of being printed by the printer unit, said control method comprising:

a print control step of causing the printer unit to print the data of the memory unit; and a job control step of causing the printer unit to be able to execute a printing process of the data, from among the data of the memory unit, of the job for the collation process to the sheet in the sheet storage unit after the sheet was set in the sheet storage unit, and of causing to be able to wait for the printing process of the data, from among the data of the memory unit, of that job and to be able to use the first image formation apparatus for another job when the sheet is not set in the sheet storage unit.

3. A control method according to claim 2, further comprising a dispersion control step of causing the first image formation apparatus and the second image formation apparatus to execute a dispersion printing process for executing by both the first and second image formation apparatuses a printing process of data output by a superordinate apparatus including a computer capable of being connected to a network, wherein the sheet storage unit of the first image formation apparatus can stack the sheets subjected to the printing in the dispersion printing process by the second image formation apparatus, the first image formation apparatus can execute the collation process of the sheet from the sheet storage unit subjected to the printing by the second image formation apparatus and the sheet subjected to the printing by the printer unit, and said job control step enables execution of the dispersion printing process in the first image formation apparatus by the printer unit after the sheet subjected to the printing in the dispersion printing process by the second image formation apparatus was set in the sheet storage unit of the first image formation apparatus, includes causing execution to wait for a start of the dispersion printing process by the printer unit of the first image formation apparatus, and includes storing in the memory unit of the first image formation apparatus the data of the job to be subjected to the dispersion printing process by the first image formation apparatus when the sheet subjected to the printing in the dispersion printing process by the second image formation apparatus is not set in the sheet storage unit of the first image formation apparatus.

4. A control method according to claim 3, further comprising a display control step of enabling to execute first display concerning status information of the first image formation apparatus capable of executing the dispersion printing process on a display unit of the computer, and enabling to execute second display concerning status information of the second image formation apparatus capable of executing the dispersion printing process on the display unit of the computer.

5. A control method according to claim 2, wherein the first image formation apparatus has plural functions including a copy function for causing the printer unit to print data from a scanner unit through said memory unit, and a printer function for causing the printer unit to print the data output from the computer through the memory unit.

6. A data processing method which is suitable for an image formation system including a first image formation apparatus and a second image formation apparatus capable of printing data of a computer, said method comprising:

a dispersion printing control step of causing to execute a dispersion printing process for executing a printing process of the data of the computer by both the first image formation apparatus and the second image formation apparatus; and a selection step of, via the computer, selecting one of plural dispersion modes including a first dispersion mode for transmitting data of a page the same as that of page data to be transmitted to the first image formation apparatus to the second image formation apparatus when the data of the computer necessary for the dispersion printing process by the first image formation apparatus and the second image formation apparatus is transmitted respectively to the first image formation apparatus and the second image formation apparatus, and a second dispersion mode for transmitting data of a page different from that of the page data to be transmitted to the first image formation apparatus to the second image formation apparatus when the data of the computer necessary for the dispersion printing process by the first image formation apparatus and the second image formation apparatus is transmitted respectively to the first image formation apparatus and the second image formation apparatus.

7. A data processing method which is suitable for an image formation system including a first image formation apparatus and a second image formation apparatus capable of printing data of a computer, wherein the first image formation apparatus and the second image formation apparatus can execute a dispersion printing process for executing a printing process of the data of the computer by both the first image formation apparatus and the second image formation apparatus, said data processing method comprising:

a selection step of, via the computer, enabling to select one of plural dispersion modes including a first dispersion mode for transmitting data of a page the same as that of page data to be transmitted to the first image formation apparatus to the second image formation apparatus when the data of the computer necessary for the dispersion printing process by the first image formation apparatus and the second image formation apparatus is transmitted respectively to the first image formation apparatus and the second image formation apparatus, and a second dispersion mode for transmitting data of a page different from that of the page data to be transmitted to the first image formation apparatus to the second image formation apparatus when the data of the computer necessary for the dispersion printing process by the first image formation apparatus and the second image formation apparatus is transmitted respectively to the first image formation apparatus and the second image formation apparatus; and a transmission control step of causing the computer to execute outputting so as to transmit the data of the page the same as that of the page data to be transmitted to the first image formation apparatus to the second image formation apparatus when the first dispersion mode is selected in the computer and so as to transmit the data of the page different from that of the page data to be transmitted to the first image formation apparatus to the second image formation apparatus when the second dispersion mode is selected in the computer.

8. A data processing method according to claim 7, wherein the first image formation apparatus and the second image formation apparatus can execute the dispersion printing process for executing the printing process of the data of the computer corresponding to plural pages including a color page and a black/white page by both the first image formation apparatus and the second image formation apparatus, and said transmission control step includes causing the computer to execute the outputting so as to transmit the data of both the color page and the black/white page to the first image formation apparatus and also transmit the data of both the color page and the black/white page to the second image formation apparatus when the first dispersion mode is selected in the computer, and causing the computer to execute the outputting so as not to transmit the data of the black/white page but to transmit the data of the color page to the first image formation apparatus and so as not to transmit the data of the color page but to transmit the data of the black/white page to the second image formation apparatus when the second dispersion mode is selected in the computer.

9. A data processing method according to claim 7, further comprising a display control step of causing a display unit of the computer to display a setting screen for the printing, wherein said selection step includes selecting one of the plural dispersion modes based on a user's setting on the setting screen.

10. A data processing method according to claim 7, further comprising a display control step of causing a display unit of the computer to display a setting screen including setting items for causing a user to designate the number of prints, wherein said selection step includes selecting one of the plural dispersion modes based on a user's setting on the setting screen.

11. A data processing method according to claim 7, further comprising a display control step of causing a display unit of the computer to perform displaying for enabling a user oneself to select one of the plural dispersion modes, wherein said selection step includes selecting, from among the plural dispersion modes, the dispersion mode selected in a user's operation through the displaying.

12. A data processing method according to claim 7, wherein the image formation system includes the plural image formation apparatuses capable of executing the dispersion printing process, and said data processing method further comprises a device selection step of enabling, via the computer, to select from among the plural image formation apparatuses a candidate of the image formation apparatus acting as the first image formation apparatus to execute the dispersion printing process and to select from among the plural image formation apparatuses a candidate of the image formation apparatus acting as the second image formation apparatus to execute the dispersion printing process.

13. A data processing method according to claim 12, further comprising a display control step of causing a display unit of the computer to execute first displaying for causing a user to specify from among the plural image formation apparatuses the candidate of the image formation apparatus acting as the first image formation apparatus to execute the dispersion printing process, and causing the display unit of the computer to execute second displaying for causing the user to specify from among the plural image formation apparatuses the candidate of the image formation apparatus acting as the second image formation apparatus to execute the dispersion printing process, wherein said device selection step includes selecting the first image formation apparatus to execute the dispersion printing process on the basis of a user's setting on the first displaying and selecting the second image formation apparatus to execute the dispersion printing process on the basis of user's setting on the second displaying.

14. A data processing method according to claim 7, further comprising a display control step of causing a display unit of the computer to execute first displaying for notifying a user of status information of the first image formation apparatus, and causing the display unit of the computer to execute second displaying for notifying the user of status information of the second image formation apparatus.

15. A data processing method according to claim 7, further comprising:

a memory control step of causing a memory unit of the first image formation apparatus capable of storing data of plural jobs to store the data of the computer necessary for the dispersion printing process, and causing a memory unit of the second image formation apparatus capable of storing data of plural jobs to store the data of the computer necessary for the dispersion printing process; and a dispersion printing control step of causing execution of the dispersion printing process in the first image formation apparatus through the memory unit of the first image formation apparatus, and causing execution of the dispersion printing process in the second image formation apparatus through the memory unit of the second image formation apparatus.

16. A data processing method according to claim 7, wherein the computer, the first image formation apparatus and the second image formation apparatus have the ability of respectively performing data communication through a network.

17. A computer-readable storage medium storing computer executable instructions for performing a control method for an image formation system which includes a first image formation apparatus having a sheet storage unit capable of storing a sheet subjected to printing by a second image formation apparatus, wherein the first image formation apparatus can transport the sheet set in the sheet storage unit, without a printer unit of the first image formation apparatus, the first image formation apparatus can execute a collation process of the sheet from the sheet storage unit and a sheet subjected to printing by the printer unit, and the first image formation apparatus comprises a memory unit adapted to be able to store data of plural jobs capable of being printed by the printer unit, said control method comprising:

a print control step of causing the printer unit to print the data of the memory unit; and a job control step of causing the printer unit to be able to execute a printing process of the data, from among the data of the memory unit, of the job for the collation process to the sheet in the sheet storage unit after the sheet was set in the sheet storage unit, and of causing to be able to wait for the printing process of the data, from among the data of the memory unit, of that job and to be able to use the first image formation apparatus for another job when the sheet is not set in the sheet storage unit.

18. A computer-readable storage medium storing computer executable instructions for performing a data processing method which is suitable for an image formation system including a first image formation apparatus and a second image formation apparatus capable of printing data of a computer, said method comprising:

a dispersion printing control step of causing to execute a dispersion printing process for executing a printing process of the data of the computer by both the first image formation apparatus and the second image formation apparatus; and a selection step of, via the computer, selecting one of plural dispersion modes including a first dispersion mode for transmitting data of a page the same as that of page data to be transmitted to the first image formation apparatus to the second image formation apparatus when the data of the computer necessary for the dispersion printing process by the first image formation apparatus and the second image formation apparatus is transmitted respectively to the first image formation apparatus and the second image formation apparatus, and a second dispersion mode for transmitting data of a page different from that of the page data to be transmitted to the first image formation apparatus to the second image formation apparatus when the data of the computer necessary for the dispersion printing process by the first image formation apparatus and the second image formation apparatus is transmitted respectively to the first image formation apparatus and the second image formation apparatus.

19. A computer-readable storage medium storing computer executable instructions for performing a data processing method which is suitable for an image formation system including a first image formation apparatus and a second image formation apparatus capable of printing data of a computer, wherein the first image formation apparatus and the second image formation apparatus can execute a dispersion printing process for executing a printing process of the data of the computer by both the first image formation apparatus and the second image formation apparatus, said data processing method comprising:

a selection step of, via the computer, enabling to select one of plural dispersion modes including a first dispersion mode for transmitting data of a page the same as that of page data to be transmitted to the first image formation apparatus to the second image formation apparatus when the data of the computer necessary for the dispersion printing process by the first image formation apparatus and the second image formation apparatus is transmitted respectively to the first image formation apparatus and the second image formation apparatus, and a second dispersion mode for transmitting data of a page different from that of the page data to be transmitted to the first image formation apparatus to the second image formation apparatus when the data of the computer necessary for the dispersion printing process by the first image formation apparatus and the second image formation apparatus is transmitted respectively to the first image formation apparatus and the second image formation apparatus; and a transmission control step of causing the computer to execute outputting so as to transmit the data of the page the same as that of the page data to be transmitted to the first image formation apparatus to the second image formation apparatus when the first dispersion mode is selected in the computer and so as to transmit the data of the page different from that of the page data to be transmitted to the first image formation apparatus to the second image formation apparatus when the second dispersion mode is selected in the computer.

20. A computer executable program stored on a computer-readable medium which, upon execution, effects performance of a control method for an image formation system which includes a first image formation apparatus having a sheet storage unit capable of storing a sheet subjected to printing by a second image formation apparatus, wherein the first image formation apparatus can transport the sheet set in the sheet storage unit, without a printer unit of the first image formation apparatus, the first image formation apparatus can execute a collation process of the sheet from the sheet storage unit and a sheet subjected to printing by the printer unit, and the first image formation apparatus comprises a memory unit adapted to be able to store data of plural jobs capable of being printed by the printer unit, said control method comprising:

a print control step of causing the printer unit to print the data of the memory unit; and a job control step of causing the printer unit to be able to execute a printing process of the data, from among the data of the memory unit, of the job for the collation process to the sheet in the sheet storage unit after the sheet was set in the sheet storage unit, and of causing to be able to wait for the printing process of the data, from among the data of the memory unit, of that job and to be able to use the first image formation apparatus for another job when the sheet is not set in the sheet storage unit.

21. A computer executable program stored on a computer-readable medium which, upon execution, effects performance of a data processing method which is suitable for an image formation system including a first image formation apparatus and a second image formation apparatus capable of printing data of a computer, said method comprising:

a dispersion printing control step of causing to execute a dispersion printing process for executing a printing process of the data of the computer by both the first image formation apparatus and the second image formation apparatus; and a selection step of, via the computer, selecting one of plural dispersion modes including a first dispersion mode for transmitting data of a page the same as that of page data to be transmitted to the first image formation apparatus to the second image formation apparatus when the data of the computer necessary for the dispersion printing process by the first image formation apparatus and the second image formation apparatus is transmitted respectively to the first image formation apparatus and the second image formation apparatus, and a second dispersion mode for transmitting data of a page different from that of the page data to be transmitted to the first image formation apparatus to the second image formation apparatus when the data of the computer necessary for the dispersion printing process by the first image formation apparatus and the second image formation apparatus is transmitted respectively to the first image formation apparatus and the second image formation apparatus.

22. A computer executable program stored on a computer-readable medium which, upon execution, effects performance of a data processing method which is suitable for an image formation system including a first image formation apparatus and a second image formation apparatus capable of printing data of a computer, wherein the first image formation apparatus and the second image formation apparatus can execute a dispersion printing process for executing a printing process of the data of the computer by both the first image formation apparatus and the second image formation apparatus, said data processing method comprising:

a selection step of, via the computer, enabling to select one of plural dispersion modes including a first dispersion mode for transmitting data of a page the same as that of page data to be transmitted to the first image formation apparatus to the second image formation apparatus when the data of the computer necessary for the dispersion printing process by the first image formation apparatus and the second image formation apparatus is transmitted respectively to the first image formation apparatus and the second image formation apparatus, and a second dispersion mode for transmitting data of a page different from that of the page data to be transmitted to the first image formation apparatus to the second image formation apparatus when the data of the computer necessary for the dispersion printing process by the first image formation apparatus and the second image formation apparatus is transmitted respectively to the first image formation apparatus and the second image formation apparatus; and a transmission control step of causing the computer to execute outputting so as to transmit the data of the page the same as that of the page data to be transmitted to the first image formation apparatus to the second image formation apparatus when the first dispersion mode is selected in the computer and so as to transmit the data of the page different from that of the page data to be transmitted to the first image formation apparatus to the second image formation apparatus when the second dispersion mode is selected in the computer.

* * * * *

UNITED STATES PATENT AND TRADEMARK OFFICE
CERTIFICATE OF CORRECTION

PATENT NO. : 7,119,920 B2
APPLICATION NO. : 10/924894
DATED : October 10, 2006
INVENTOR(S) : Takahashi It is certified that error appears in the above-identified patent and that said Letters Patent is hereby corrected as shown below:

ON THE TITLE PAGE ITEM [57] IN THE ABSTRACT:
  Line 14, "an" (first occurrence) should read -- a --.

COLUMN 1:
  Line 20, "an" should read -- a --;
  Line 25, "coexist" should read -- coexisting --;
  Line 33, "an" should read -- a --;
  Line 37, "inconvenience" should read -- inconvenient --;
  Line 40, "inconvenience" should read -- inconvenient --;
  Line 54, "enables" should read -- that enables --;
  Line 55, "image formed" should read -- formed image --; and
  Line 58, "contains" should read -- containing --.

COLUMN 2:
  Line 9, "a" (second occurrence) should read -- an --; and
  Line 18, "shows" should read -- showing --.

COLUMN 3:
  Line 45, "sever," should read -- server, --.

COLUMN 5:
  Line 27, "FIG. 7" should read -- FIG. 7. --; and
  Line 67, "do" should read -- to --.

COLUMN 6:
  Line 17, "expose" should read -- exposes --.

COLUMN 7:
  Line 44, "enters" should read -- enter --; and
  Line 55, "as" should read -- a --.

COLUMN 9:
  Line 56, "an" should read -- a --.

COLUMN 10:
  Line 45, "traffics," should read -- traffic, --.

UNITED STATES PATENT AND TRADEMARK OFFICE
CERTIFICATE OF CORRECTION

PATENT NO. : 7,119,920 B2
APPLICATION NO. : 10/924894
DATED : October 10, 2006
INVENTOR(S) : Takahashi It is certified that error appears in the above-identified patent and that said Letters Patent is hereby corrected as shown below:

COLUMN 11:
    Line 26, "sa" should read -- is --; and
    Line 67, "restriction" should read -- restriction of --.

COLUMN 12:
    Line 12, "an" should read -- a --;
    Line 16, "switched" should read -- is switched --; and
    Line 33, "For examples" should read -- Examples --.

COLUMN 17:
    Line 62 claim 11, "oneself" should be deleted.

Signed and Sealed this

Twenty-fourth Day of June, 2008

JON W. DUDAS
*Director of the United States Patent and Trademark Office*